US011606677B2

(12) United States Patent
Wang et al.

(10) Patent No.: US 11,606,677 B2
(45) Date of Patent: *Mar. 14, 2023

(54) METHOD FOR SHARING APPLICATION BETWEEN TERMINALS, AND TERMINAL

(71) Applicant: Huawei Device Co., Ltd., Dongguan (CN)

(72) Inventors: Chan Wang, Shenzhen (CN); Huangwei Wu, Shenzhen (CN); Jiejing Huang, Shenzhen (CN); Xi Huang, Shenzhen (CN)

(73) Assignee: Huawei Device Co., Ltd., Dongguan (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/922,477

(22) Filed: Jul. 7, 2020

(65) Prior Publication Data
US 2020/0336877 A1 Oct. 22, 2020

Related U.S. Application Data

(63) Continuation of application No. 15/023,333, filed as application No. PCT/CN2014/092469 on Nov. 28, 2014, now Pat. No. 10,715,980.

(30) Foreign Application Priority Data

Nov. 29, 2013 (CN) .......................... 201310632696.5

(51) Int. Cl.
H04W 4/60 (2018.01)
H04W 4/50 (2018.01)
(Continued)

(52) U.S. Cl.
CPC ................ H04W 4/60 (2018.02); G06F 8/61 (2013.01); H04L 67/06 (2013.01); H04L 67/10 (2013.01); H04W 4/50 (2018.02)

(58) Field of Classification Search
CPC .. H04W 4/60; H04W 4/50; G06F 8/61; H04L 67/06; H04L 67/10
(Continued)

(56) References Cited

U.S. PATENT DOCUMENTS 6,601,087 B1 7/2003 Zhu et al.
7,383,308 B1 6/2008 Groves et al.
(Continued)

FOREIGN PATENT DOCUMENTS

CA 2800917 C * 3/2019 ......... G06F 16/1873
CA 2860374 C * 11/2020 ........... G06F 3/0481
(Continued)

OTHER PUBLICATIONS

Ichimura et al., "Lightweight Desktop-sharing System for Web Browsers," IEEE Computer Society, XP010821214, pp. 1-6, Institute of Electrical and Electronics Engineers, New York, New York (2005).
(Continued)

Primary Examiner — David R Lazaro
Assistant Examiner — Berhanu Shitayewoldetadik
(74) Attorney, Agent, or Firm — Leydig, Voit & Mayer, Ltd.

(57) ABSTRACT

Embodiments of the present invention provide a method for sharing an application between terminals, and a terminal, so as to facilitate user operations at a receiving end. The method includes: generating, by a first terminal according to an application that has been installed, a shared application installation package of the application; sending, by the first terminal, the shared application installation package to a second terminal, so that the second terminal installs the shared application installation package; determining, by the first terminal, shared data of the application that has been installed, where the shared data is data that is from an
(Continued)

application server and required for the application to run; and sending, by the first terminal, the shared data to the second terminal, so that the second terminal uses the shared data when running the shared application. In the embodiments of the present invention, when sharing an application, two terminals not only share an installation package of the application, but also share shared data of the application, so that a receiving end does not need to download the shared data from an application server, which facilitates user operations at the receiving end and improves user experience.

18 Claims, 20 Drawing Sheets

(51) Int. Cl.
　　　*G06F 15/16*　　　(2006.01)
　　　*G06F 8/61*　　　(2018.01)
　　　*H04L 29/08*　　　(2006.01)
　　　*H04L 15/16*　　　(2006.01)
　　　*H04L 67/06*　　　(2022.01)
　　　*H04L 67/10*　　　(2022.01)

(58) Field of Classification Search
　　　USPC .......................................................... 709/217
　　　See application file for complete search history.

(56) References Cited

U.S. PATENT DOCUMENTS

| | | | |
|---|---|---|---|
| 8,321,857 B1* | 11/2012 | Prosso | G06F 8/61 717/172 |
| 8,725,645 B1 | 5/2014 | Montini et al. | |
| 9,426,641 B1 | 8/2016 | Ghoshal et al. | |
| 10,715,980 B2* | 7/2020 | Wang | H04W 4/50 |
| 2002/0049841 A1* | 4/2002 | Johnson | H04L 67/10 709/225 |
| 2003/0061106 A1* | 3/2003 | Orhomuru | G06Q 30/0601 705/26.1 |
| 2004/0252185 A1 | 12/2004 | Vernon et al. | |
| 2005/0113079 A1* | 5/2005 | Guo | H04M 1/7243 455/418 |
| 2006/0010392 A1 | 1/2006 | Noel et al. | |
| 2006/0061468 A1 | 3/2006 | Ruha | |
| 2006/0143129 A1 | 6/2006 | Holm et al. | |
| 2006/0190826 A1 | 8/2006 | Montgomery et al. | |
| 2006/0223627 A1* | 10/2006 | Nozaki | G07F 17/34 463/20 |
| 2007/0078953 A1 | 4/2007 | Chai et al. | |
| 2007/0143446 A1* | 6/2007 | Morris | G06F 8/61 709/219 |
| 2007/0214423 A1 | 9/2007 | Teplov et al. | |
| 2007/0239859 A1 | 10/2007 | Wilkinson et al. | |
| 2008/0043736 A1* | 2/2008 | Stanley | H04L 67/06 370/392 |
| 2008/0086609 A1 | 4/2008 | Lesser et al. | |
| 2009/0094339 A1 | 4/2009 | Allen et al. | |
| 2009/0260003 A1 | 10/2009 | Matsugashita | |
| 2010/0293540 A1* | 11/2010 | Sheehan | G06F 8/61 717/174 |
| 2011/0047597 A1* | 2/2011 | Mahaffey | H04L 63/10 709/219 |
| 2011/0145920 A1* | 6/2011 | Mahaffey | H04W 12/12 726/22 |
| 2012/0036199 A1 | 2/2012 | Slee et al. | |
| 2012/0062688 A1 | 3/2012 | Shen et al. | |
| 2012/0077586 A1 | 3/2012 | Pishevar | |
| 2012/0089485 A1* | 4/2012 | Williams | G06F 8/61 705/26.61 |
| 2012/0089971 A1* | 4/2012 | Williams | G06F 8/61 717/177 |
| 2012/0110174 A1* | 5/2012 | Wootton | H04L 63/1416 709/224 |
| 2012/0240236 A1* | 9/2012 | Wyatt | G06F 21/564 726/25 |
| 2012/0269185 A1 | 10/2012 | Castleman et al. | |
| 2012/0311010 A1 | 12/2012 | Shah | |
| 2013/0015954 A1* | 1/2013 | Thorne | G06F 40/169 340/8.1 |
| 2013/0047149 A1 | 2/2013 | Xu et al. | |
| 2013/0074197 A1 | 3/2013 | Shelton | |
| 2013/0091558 A1 | 4/2013 | Kim et al. | |
| 2013/0117432 A1 | 5/2013 | Jiang | |
| 2013/0124619 A1 | 5/2013 | Steakley | |
| 2013/0144950 A1 | 6/2013 | Sanakaranarasimhan et al. | |
| 2013/0167137 A1* | 6/2013 | Bansod | G06F 8/61 717/175 |
| 2013/0225087 A1 | 8/2013 | Uhm | |
| 2013/0275553 A1* | 10/2013 | Shilo | H04L 67/1095 709/217 |
| 2013/0318568 A1* | 11/2013 | Mahaffey | H04L 67/01 726/3 |
| 2013/0339941 A1 | 12/2013 | Shelton | |
| 2014/0006347 A1* | 1/2014 | Qureshi | H04W 12/06 707/783 |
| 2014/0019957 A1 | 1/2014 | Wang et al. | |
| 2014/0075430 A1 | 3/2014 | Zheng | |
| 2014/0082519 A1* | 3/2014 | Wang | H04M 1/72403 715/748 |
| 2014/0129637 A1 | 5/2014 | Rohrs et al. | |
| 2014/0172726 A1* | 6/2014 | Junger | G06Q 10/00 705/304 |
| 2014/0344346 A1 | 11/2014 | Lee et al. | |
| 2014/0359605 A1* | 12/2014 | Leet | G06F 8/61 717/174 |
| 2015/0007165 A1* | 1/2015 | Zhao | G06F 8/658 717/174 |
| 2015/0193216 A1* | 7/2015 | Li | G06F 8/61 717/175 |
| 2015/0254067 A1* | 9/2015 | Nigam | H04L 41/0843 717/175 |
| 2015/0301815 A1* | 10/2015 | Tervo | G06Q 20/326 717/178 |
| 2015/0304440 A1* | 10/2015 | Zheng | H04L 67/55 717/177 |
| 2016/0054989 A1* | 2/2016 | Diebolt | H04W 12/04 717/177 |
| 2016/0063266 A1* | 3/2016 | Huang | G06F 21/62 726/30 |
| 2016/0274881 A1* | 9/2016 | Wang | H04L 61/5007 |
| 2016/0301699 A1* | 10/2016 | Wang | H04L 67/125 |
| 2017/0199751 A1* | 7/2017 | Sama | H04L 67/10 |
| 2017/0215055 A1* | 7/2017 | Tang | H04B 7/26 |
| 2017/0235558 A1* | 8/2017 | Saenz | G06F 8/61 717/175 |
| 2017/0262273 A1* | 9/2017 | Xu | G06F 8/62 |
| 2018/0338232 A1* | 11/2018 | Wesby | H04W 4/60 |
| 2018/0367601 A1* | 12/2018 | Cao | H04L 67/02 |
| 2019/0171430 A1* | 6/2019 | Xu | G06F 8/61 |
| 2021/0255899 A1* | 8/2021 | Chen | G06F 9/505 |

FOREIGN PATENT DOCUMENTS

| | | | | |
|---|---|---|---|---|
| CA | 2896645 C | * | 2/2021 | ............ G01B 15/00 |
| CN | 101160942 A | | 4/2008 | |
| CN | 101535973 A | | 9/2009 | |
| CN | 101674110 A | | 3/2010 | |
| CN | 101860591 A | | 10/2010 | |
| CN | 101883140 A | | 11/2010 | |
| CN | 101888519 A | | 11/2010 | |
| CN | 102130948 A | | 7/2011 | |
| CN | 102143156 A | | 8/2011 | |
| CN | 102262544 A | | 11/2011 | |
| CN | 102821109 A | | 12/2012 | |
| CN | 102970428 A | | 3/2013 | |
| CN | 103294338 A | | 9/2013 | |
| CN | 103339602 A | | 10/2013 | |
| EP | 1590718 A1 | | 11/2005 | |
| WO | 2004077207 A2 | | 9/2004 | |
| WO | WO-2005050921 A1 | * | 6/2005 | ......... H04L 12/2803 |

(56) References Cited

FOREIGN PATENT DOCUMENTS

| | | | |
|---|---|---|---|
| WO | 2012084724 A1 | 6/2012 | |
| WO | WO-2013033999 A1 * | 3/2013 | ............ H04W 8/005 |
| WO | 2013123833 A1 | 8/2013 | |

OTHER PUBLICATIONS

CN/201910122069.4, Office Action and Search Report, dated Nov. 2, 2022.

U.S. Appl. No. 15/023,333, filed Mar. 18, 2016.

* cited by examiner

METHOD FOR SHARING APPLICATION BETWEEN TERMINALS, AND TERMINAL

CROSS-REFERENCE TO RELATED APPLICATIONS

This application is a continuation of U.S. patent application Ser. No. 15/023,333 filed on Mar. 18, 2016 which is a National Stage entry of International Application No. PCT/CN2014/092469 filed on Nov. 28, 2014, which claims priority to Chinese Patent Application No. 201310632696.5, filed with the Chinese Patent Office on Nov. 29, 2013 and entitled "METHOD FOR SHARING APPLICATION BETWEEN TERMINALS, AND TERMINAL", which is incorporated herein by reference in its entirety.

TECHNICAL FIELD

Embodiments of the present invention relate to the communications field, and in particular, to a method for sharing an application between terminals, and a terminal.

BACKGROUND

As mobile terminals develop, more applications run on the mobile terminal. When a user of a terminal needs an application, the user will download the application from a mobile application store, such as Google Play, App Store, or another application store (for example, a third-party application store), or may ask a buddy to transfer the required application to the user by means of application sharing between terminals.

However, in the prior art, when application sharing is performed between terminals, a sending end (a sending end of an application) sends only an installation package of the application to a receiving end (a receiving end of the application). After receiving the installation package of the application, the receiving end still needs to download, from an application server, data required for the application to run, which is inconvenient.

SUMMARY

Embodiments of the present invention provide a method for sharing an application between terminals, and a terminal, so as to facilitate user operations at a receiving end.

According to a first aspect, a method for sharing an application between terminals is provided, including: generating, by a first terminal according to an application that has been installed, a shared application installation package of the application; sending, by the first terminal, the shared application installation package to a second terminal, so that the second terminal installs the shared application installation package; determining, by the first terminal, shared data of the application that has been installed, where the shared data is data that is from an application server and required for the application to run; and sending, by the first terminal, the shared data to the second terminal, so that the second terminal uses the shared data when running the application that is shared.

With reference to the first aspect, in an implementation manner of the first aspect, the shared data is stored in a public data file of the first terminal, and the determining shared data of the application that has been installed includes: extracting the shared data from the public data file.

With reference to the first aspect or any one of the foregoing implementation manners, in another implementation manner of the first aspect, a storage path of the public data file on the first terminal is a storage path that is defined according to an instruction of the installation package when the installation package is run.

With reference to the first aspect or any one of the foregoing implementation manners, in another implementation manner of the first aspect, a storage path of the public data file on the first terminal is a storage path defined by the first terminal.

With reference to the first aspect or any one of the foregoing implementation manners, in another implementation manner of the first aspect, the shared data is data in an offline data file provided by the application server; before the determining shared data of the application that has been installed, the method further includes: recording a storage position of the data in the offline data package; and the determining shared data of the application that has been installed includes: extracting the data in the offline data package from the recorded storage position as the shared data.

According to a second aspect, a method for sharing an application between terminals is provided, including: receiving, by a second terminal, a shared application installation package of an application from a first terminal, and receiving shared data of the application, where the shared data is data that is from an application server and required for the application to run, and the shared application installation package of the application is generated by the first terminal according to the application that has been installed; and storing, by the second terminal, the shared data.

According to a third aspect, a method for verifying application security is provided, including: receiving, by a first terminal, a first installation package of an application, and extracting verification information from the first installation package, where the verification information is used to determine whether the first installation package is from an application server; determining, by the first terminal according to the verification information, whether the first installation package is from the application server; and when the first installation package is not from the application server, acquiring, by the first terminal, a second installation package of the application from the application server, and overwriting the first installation package by using the second installation package; or when the first installation package is from the application server, running, by the first terminal, the first installation package.

With reference to the third aspect, in an implementation manner of the third aspect, the determining, according to the verification information, whether the first installation package is from the application server includes: sending the verification information to the application server, so that the application server checks, according to a match between the verification information and source information, whether the first installation package is from the application server, where the source information is extracted by the application server from the second installation package; and receiving a check result of the application server.

According to a fourth aspect, a method for verifying application security is provided, including: receiving, by an application server, verification information sent by a first terminal, where the verification information is extracted by the first terminal from a first installation package of an application, and the verification information is used to determine whether the first installation package is from the application server; extracting, by the application server, source information from a second installation package that is of the application and stored in the application server; and determining, by the application server according to a match between the source information and the verification information, whether the first installation package is from the application server, and sending a matching result to the first terminal.

According to a fifth aspect, a method for processing an application is provided, including: receiving an installation package of a first application, where the installation package includes an identifier of the first application and an identifier of a second application, and the second application is an old version of the first application; and checking, according to the identifier of the second application, whether the second application has been installed on a system, and if the second application has been installed on the system, installing the first application and removing the second application.

According to a sixth aspect, a terminal is provided, including: a generating unit, configured to generate, according to an application that has been installed, a shared application installation package of the application; a sending unit, configured to send the shared application installation package generated by the generating unit to a second terminal, so that the second terminal installs the shared application installation package; and a determining unit, configured to determine shared data of the application that has been installed, where the shared data is data that is from an application server and required for the application to run; where the sending unit is further configured to send the shared data determined by the determining unit to the second terminal, so that the second terminal uses the shared data when running the application that is shared.

With reference to the sixth aspect, in an implementation manner of the sixth aspect, the shared data is stored in a public data file of the terminal, and the determining unit is specifically configured to extract the shared data from the public data file.

With reference to the sixth aspect or any one of the foregoing implementation manners, in another implementation manner of the sixth aspect, a storage path of the public data file on the terminal is a storage path that is defined according to an instruction of the installation package when the installation package is run.

With reference to the sixth aspect or any one of the foregoing implementation manners, in another implementation manner of the sixth aspect, a storage path of the public data file on the terminal is a storage path defined by the terminal.

With reference to the sixth aspect or any one of the foregoing implementation manners, in another implementation manner of the sixth aspect, the shared data is data in an offline data file provided by the application server; the terminal further includes: a recording unit, configured to record a storage position of the data in the offline data package; and the determining unit is specifically configured to extract the data in the offline data package from the recorded storage position as the shared data.

According to a seventh aspect, a terminal is provided, including: a receiving unit, configured to receive a shared application installation package of an application from a first terminal, and receive shared data of the application, where the shared data is data that is from an application server and required for the application to run, and the shared application installation package of the application is generated by the first terminal according to the application that has been installed; and a storage unit, configured to store the shared data.

According to an eighth aspect, a terminal is provided, including: a first receiving unit, configured to receive a first installation package of an application; an extracting unit, configured to extract verification information from the first installation package received by the first receiving unit, where the verification information is used to determine whether the first installation package is from an application server; and a determining unit, configured to determine, according to the verification information extracted by the extracting unit, whether the first installation package is from the application server; and when the first installation package is not from the application server, acquire a second installation package of the application from the application server, and overwrite the first installation package by using the second installation package; or when the first installation package is from the application server, run the first installation package.

With reference to the eighth aspect, in an implementation manner of the eighth aspect, the determining unit is specifically configured to send the verification information to the application server, so that the application server checks, according to a match between the verification information and source information, whether the first installation package is from the application server, where the source information is extracted by the application server from the second installation package; and receive a check result of the application server.

According to a ninth aspect, an application server is provided, including: a receiving unit, configured to receive verification information sent by a first terminal, where the verification information is extracted by the first terminal from a first installation package of an application, and the verification information is used to determine whether the first installation package is from the application server; an extracting unit, configured to extract source information from a second installation package that is of the application and stored in the application server; a matching unit, configured to determine, according to a match between the source information extracted by the extracting unit and the verification information received by the receiving unit, whether the first installation package is from the application server; and a sending unit, configured to send a matching result of the matching unit to the first terminal.

According to a tenth aspect, a terminal is provided, including: a receiving unit, configured to receive an installation package of a first application, where the installation package includes an identifier of the first application and an identifier of a second application, and the second application is an old version of the first application; and a checking unit, configured to check, according to the identifier of the second application in the installation package received by the receiving unit, whether the second application has been installed on a system; and if the second application has been installed on the system, install the first application and delete the second application.

According to an eleventh aspect, a method for processing an application is provided, including: sending a request to an application server, where the request is used to request an installation package of a first application and an application information list containing the first application, the application information list includes an identifier of the first application and an identifier of at least one second application, the second application is an old version of the first application, and the identifier of the first application is different from the identifier of the second application; and checking, according to the identifier of the second application, whether the second application has been installed on a system, and if the second application has been installed on the system, installing the first application and removing the second application.

According to a twelfth aspect, a method for processing an application is provided, including: sending a request to an application server, where the request is used to request an installation package of a first application and an application information list containing the first application, the application information list includes certificate information of the first application and certificate information of at least one second application, the second application is an old version of the first application, and the certificate information of the first application is different from the certificate information of the second application; and checking, according to the certificate information of the second application, whether the second application has been installed on a system, and if the second application has been installed on the system, installing the first application and removing the second application.

According to a thirteenth aspect, a method for processing an application is provided, including: receiving a first installation package of an application, where the first installation package is corresponding to a first digital certificate, and the first installation package includes a public key of the first digital certificate and first verification information; receiving a second installation package of the application, where the second installation package is corresponding to a second digital certificate, and the second installation package includes a public key of the second digital certificate and second verification information; verifying, according to the first digital certificate, the first verification information, the public key of the second digital certificate, and the second verification information, whether an application corresponding to the second installation package is a new version of an application corresponding to the first installation package; and when the verification is successful, overwriting the citation of an old version with the application of the new version.

According to a fourteenth aspect, a terminal is provided, including: a sending unit, configured to send a request to an application server, where the request is used to request an installation package of a first application and an application information list containing the first application, the application information list includes an identifier of the first application and an identifier of at least one second application, the second application is an old version of the first application, and the identifier of the first application is different from the identifier of the second application; and a checking unit, configured to check, according to the identifier of the second application, whether the second application has been installed on a system, and if the second application has been installed on the system, install the first application and delete the second application.

According to a fifteenth aspect, a terminal is provided, including: a sending unit, configured to send a request to an application server, where the request is used to request an installation package of a first application and an application information list containing the first application, the application information list includes certificate information of the first application and certificate information of at least one second application, the second application is an old version of the first application, and the certificate information of the first application is different from the certificate information of the second application; and a checking unit, configured to check, according to the certificate information of the second application, whether the second application has been installed on a system, and if the second application has been installed on the system, install the first application and delete the second application.

According to a sixteenth aspect, a terminal is provided, including: a first receiving unit, configured to receive a first installation package of an application, where the first installation package is corresponding to a first digital certificate, and the first installation package includes a public key of the first digital certificate and first verification information; a second receiving unit, configured to receive a second installation package of the application, where the second installation package is corresponding to a second digital certificate, and the second installation package includes a public key of the second digital certificate and second verification information; and a verifying unit, configured to verify, according to the first digital certificate, the first verification information, the public key of the second digital certificate, and the second verification information, whether an application corresponding to the second installation package is a new version of an application corresponding to the first installation package; and when the verification is successful, overwrite the citation of an old version with the application of the new version.

In the embodiments of the present invention, when sharing an application, two terminals not only share an installation package of the application, but also share shared data of the application, so that a receiving end does not need to download the shared data from an application server, which facilitates user operations at the receiving end and improves user experience.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that the terminal in the embodiments of the present invention includes but is not limited to a mobile phone, a mobile computer, a tablet computer, a personal digital assistant (Personal Digital Assistant, PDA), a media player, a smart television, a smart watch, smart glasses, a smart band, and the like.

It should be further understood that the application in the embodiments of the present invention may be an application for use on an Android platform, or may be or an application for use on an iOS platform. For example, when the application is an application on an Android platform, an installation package of the application is generally a file with an extension ".apk"; that is, an installation package file of the application on the Android platform is appname.apk. The apk file generally includes a META-INF folder, Android-Manifest.xml, classes.dex, resources.arsc, and the like.

Figure 1:
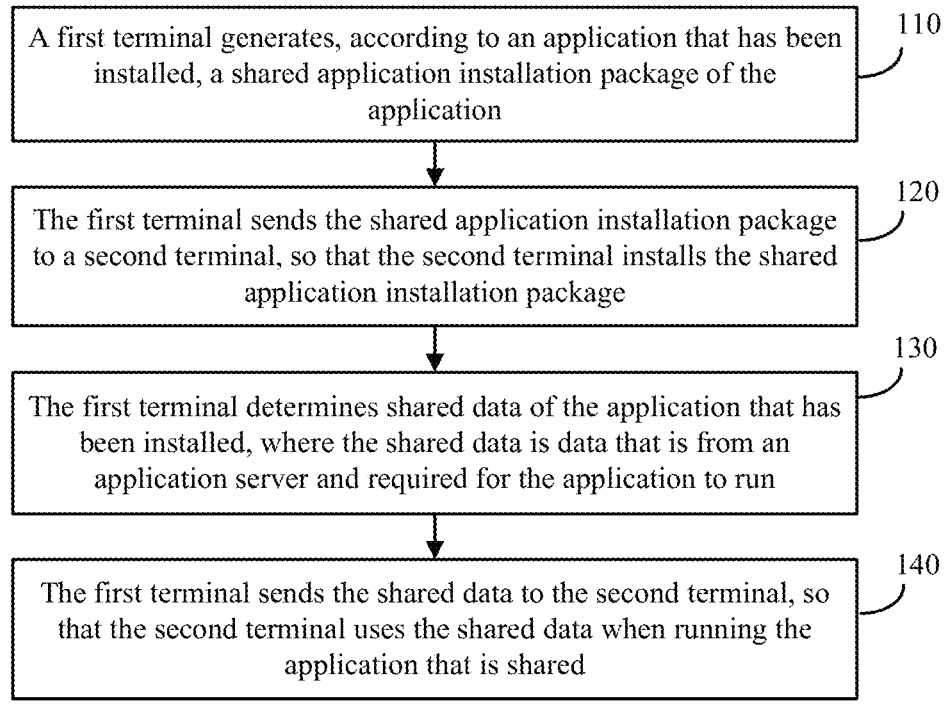
FIG. 1 is a schematic flowchart of a method for sharing an application between terminals according to an embodiment of the present invention.

FIG. 1 is a schematic flowchart of a method for sharing an application between terminals according to an embodiment of the present invention. The method includes:

110. A first terminal generates, according to an application that has been installed, a shared application installation package of the application.

120. The first terminal sends the shared application installation package to a second terminal, so that the second terminal installs the shared application installation package.

130. The first terminal determines shared data of the application that has been installed, where the shared data is data that is from an application server and required for the application to run.

It should be understood that the first terminal may determine the shared data in a plurality of manners. For example, when the application is shared, the first terminal checks data of the application piece by piece to find which data is the shared data; or data of the application is classified in advance and a storage position of the shared data is recorded, and when the application is shared, it is only necessary to extract the shared data from the storage position of the shared data.

140. The first terminal sends the shared data to the second terminal, so that the second terminal uses the shared data when running the application that is shared.

In this embodiment of the present invention, when sharing an application, two terminals not only share an installation package of the application, but also share shared data of the application, so that a receiving end does not need to download the shared data from an application server, which facilitates user operations at the receiving end and improves user experience.

In the prior art, in addition to an installation package, some other data files are further required for normal use of some applications. For example, regarding a map application, if only an installation package of the map application is transferred to a target terminal, after running the installation package, the target terminal still needs to download map data from an application server for normal use of the map application. However, much traffic of the terminal will be consumed for downloading map data.

Further, a first terminal and a second terminal transfer the shared data by using a wireless local area network (for example, by using Bluetooth, WiFi, or a WLAN) or in a wired manner, which avoids a problem of traffic consumption caused when the receiving end downloads the shared data from the application server.

It should be noted that, in step 130, that the shared data is from and provided by the application server may specifically mean that the shareable data originally comes from the application server, and does not mean that the shared data is downloaded by the first terminal from the application server. The shared data may be downloaded by the first terminal from the application server, or may be obtained by the first terminal from another terminal. For example, a developer of a map application will upload designed map data to an application server for downloading, and a terminal may download a corresponding map from the application server according to an actual requirement of the terminal.

It should be noted that the shared data in step 130 is data required when the application runs, and may specifically refer to data that must be available for normal running of the application, or may refer to data that may need to be downloaded from the application server when the application runs. For example, the application is a map application and some basic map data is needed to start the application, and then the shared data may include the basic map data; or the application is a game application and corresponding game data provided by the application server needs to be obtained when some game functions need to be implemented, and then the shared data may include the game data.

Further, in the method shown in FIG. 1, the first terminal may further send other data to the second terminal. For example, the first terminal may share some private data of the first terminal, such as a game record of the first terminal and a buddy list of the first terminal.

Further, the shared data is stored in a public data file of the first terminal, and step 130 may include: extracting the shared data from the public data file.

Specifically, each application on a terminal is corresponding to one public data folder, and the shared data is stored in the public data folder. When an application is shared between terminals, in addition to transferring an installation package, a sending end only needs to select the shared data from the public data folder.

Optionally, the first terminal may further include a private data file, where the private data file includes private data, associated with a user of the first terminal, that is generated when the first terminal runs the application.

The private data may specifically refer to data that is strongly associated with the user, such as account information of the user, a buddy list of the user, a historical chat record of the user, a game record of the user, a cache file generated when the user uses the application, a data file downloaded by the user by using download software, a picture taken by using a camera, and a private file marked by the user. The data is strongly associated with the user and of special concern to the user, that is, the data is private data of the application.

Optionally, storage paths of the public data file and the private data file on the first terminal are storage paths that are defined according to an instruction of the installation package when the installation package is run.

Specifically, when running the installation package, the terminal automatically creates a predefined path according to the instruction of the installation package, where the path includes respective storage positions of the public data file and the private data file. The path may be defined in the installation package by a developer of the application in advance, or may be defined by the application server.

Optionally, storage paths of the public data file and the private data file on the first terminal are storage paths defined by the first terminal. In other words, the storage paths of the public data file and the private data file may also be defined by the terminal. For example, the terminal automatically creates a file storage system corresponding to the application when unpacking the application, where the system indicates respective storage paths of a public data folder and a private data folder.

Optionally, according to an embodiment, the shared data is data in an offline data package provided by the application server; before step 130, the method shown in FIG. 1 may further include: recording a storage position of the data in the offline data package; and step 130 may include: extracting the data in the offline data package from the recorded storage position as the shared data.

For example, the first terminal downloads the offline data package from the application server, and creates a list of correspondences between files in the offline data package and storage paths when parsing the offline data package. When the application is shared, the data in the offline data package may be extracted according to the table and be sent to the second terminal.

Optionally, according to an embodiment, the first terminal may include a public data file and a private data file, where the public data file includes downloaded data that is from and provided by the application server and required for the application to run, and the private data file includes private data that is generated when the first terminal runs the application and associated with a user of the first terminal; and step 130 may include that: the first terminal selects shared data from the public data file and the private data file.

An App for Android is used as an example for description. In addition to an appname.apk file, the Android application may further include two data files, public data (corresponding to the public data file) and private data (corresponding to the private data file). The public data file stores data that is strongly associated with the application, that is, public data; and the private data file stores data that is strongly associated with a user, that is, private data.

Specifically, a method for determining whether data of an application is public data or private data may be as follows:

For example, it may be determined whether data is data strongly associated with the application or data strongly associated with the user. The data strongly associated with the application may be considered as public data of the application, and the data strongly associated with the user may be considered as private data of the application. Specifically, the data strongly associated with the application may be a configuration file of the application, an offline data file of the application, a database file of the application, or the like, such as a resource file of a game application and an offline map of a map application. Such data is associated only with the applications, that is, the data is public data of the application. The data strongly associated with the user may be data that is of special concern to the user, such as account information of the user, a buddy list of the user, a historical chat record of the user, a game record of the user, a cache file generated when the user uses the application, a data file downloaded by the user by using a download manager, a picture taken by using a camera, and a private file marked by the user. This data is strongly associated with the user and of special concern to the user, that is, the data is private data of the application.

If a mobile terminal cannot definitely determine whether some data files are public data files or private data files, the mobile terminal may direct the user to set whether to save data generated by an application that has been installed to a path in which the public data file is stored or to a path in which the private data file is stored.

Alternatively, whether same data files of the application that is shared are public data files or private data files may be determined according to whether the data files are accessible to another application than the application that is shared. If some data files of the application that is shared are accessible to another application than the application that is shared, these data files are public data files; and if some data files of the application that is shared are inaccessible to another application than the application that is shared, these data files are private data files.

Optionally, storage paths of the public data file and the private data file on the first terminal are storage paths that are defined according to an instruction of the installation package when the installation package is run.

Optionally, storage paths of the public data file and the private data file on the first terminal are storage paths defined by the first terminal.

The foregoing describes in detail, with reference to FIG. 1, a method for sharing an application between terminals according to an embodiment of the present invention from a perspective of a first terminal. The following describes, with reference to FIG. 2, a method for sharing an application between terminals according to an embodiment of the present invention from a perspective of a second terminal.

It should be understood that interaction between and related features and functions of a first terminal and a second terminal that are described for the second terminal side are corresponding to the descriptions for the first terminal side, and for brevity, repeated description is omitted as appropriate.

Figure 2:
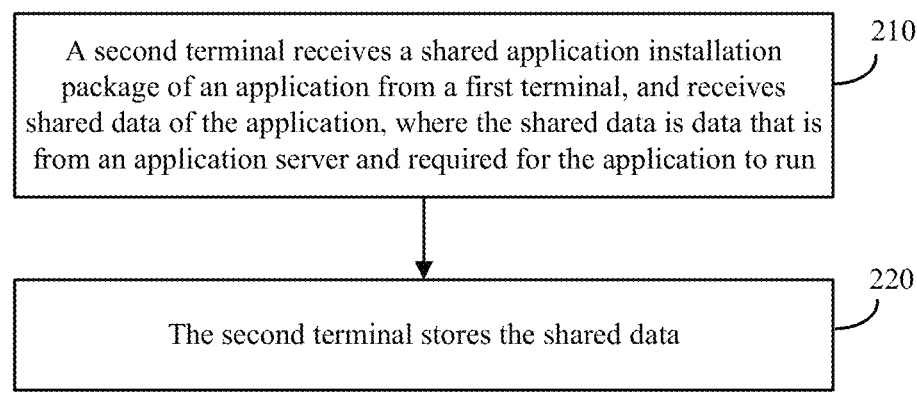
FIG. 2 is a schematic flowchart of a method for sharing an application between terminals according to an embodiment of the present invention.

FIG. 2 is a schematic flowchart of a method for sharing an application between terminals according to an embodiment of the present invention. The method includes the following steps:

210. A second terminal receives a shared application installation package of an application from a first terminal, and receives shared data of the application, where the shared data is data that is from an application server and required for the application to run.

The shared application installation package of the application is generated by the first terminal according to the application that has been installed.

220. The second terminal stores the shared data.

In this embodiment of the present invention, when sharing an application, two terminals not only share an installation package of the application, but also share shared data of the application, so that a receiving end does not need to download the shared data from an application server, which facilitates user operations at the receiving end and improves user experience.

Optionally, according to another embodiment, the method shown in FIG. 2 further includes: storing the shared data into a public data file of the second terminal.

According to this embodiment of the present invention, a storage path of the public data file on the second terminal is a storage path that is defined according to an instruction of the installation package when the installation package is run.

According to this embodiment of the present invention, a storage path of the public data file on the second terminal is a storage path defined by the second terminal.

According to this embodiment of the present invention, the shared data is data in an offline data package provided by the application server.

The following describes in more detail, with reference to specific examples, the embodiments of the present invention. It should be noted that examples in FIG. 3 to FIG. 6 are merely provided to help a person skilled in the art understand the embodiments of the present invention, but are not intended to limit the embodiments of the present invention to an exemplary specific value or specific scenario. It is obvious that a person skilled in the art may perform various equivalent modifications or alterations according to the examples provided in FIG. 3 to FIG. 6, and the modifications or alterations also fall within the scope of the embodiments of the present invention.

Figure 3:
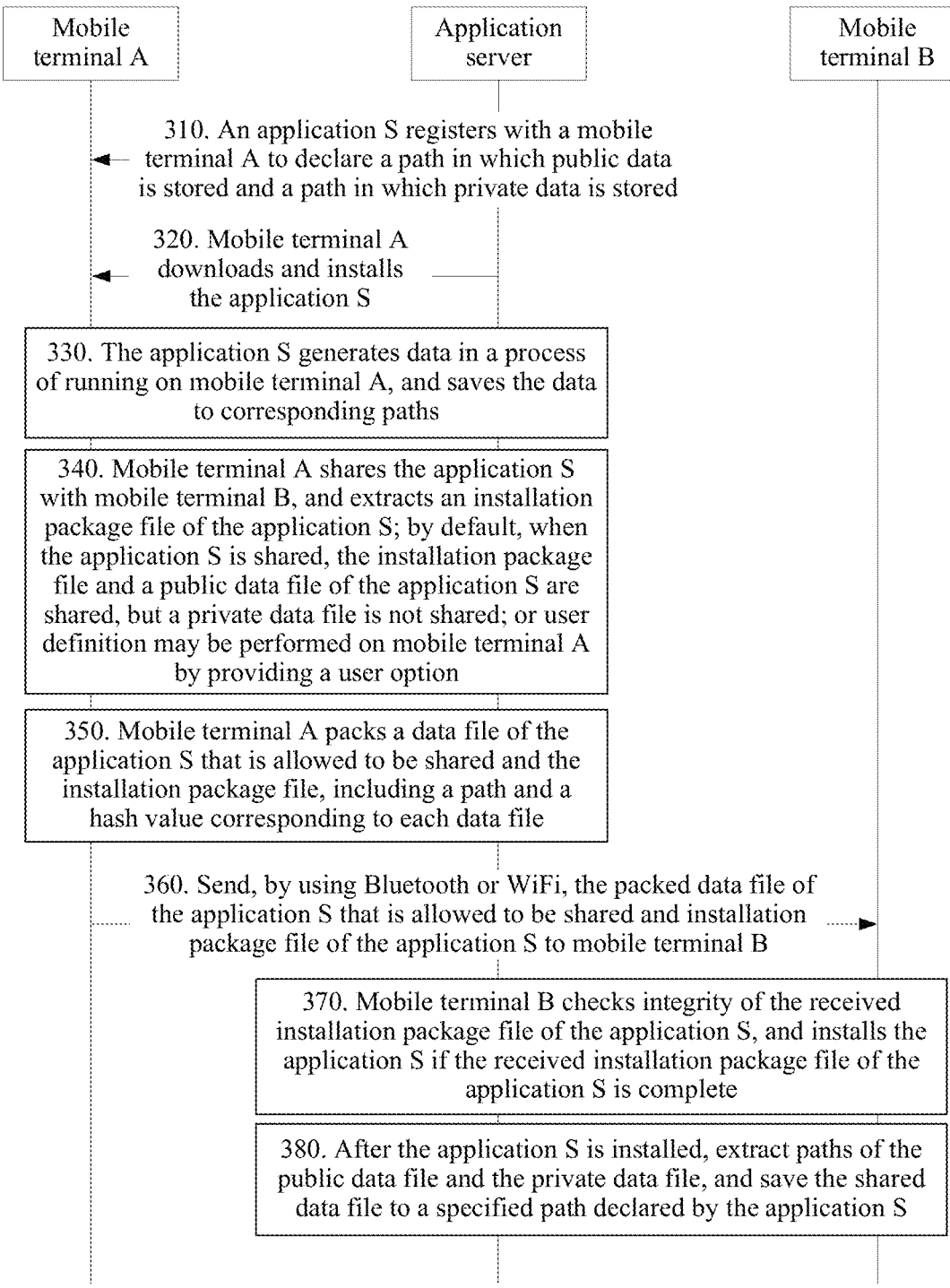
FIG. 3 is a flowchart of a method for sharing an application between terminals according to an embodiment of the present invention.
Figure 4:
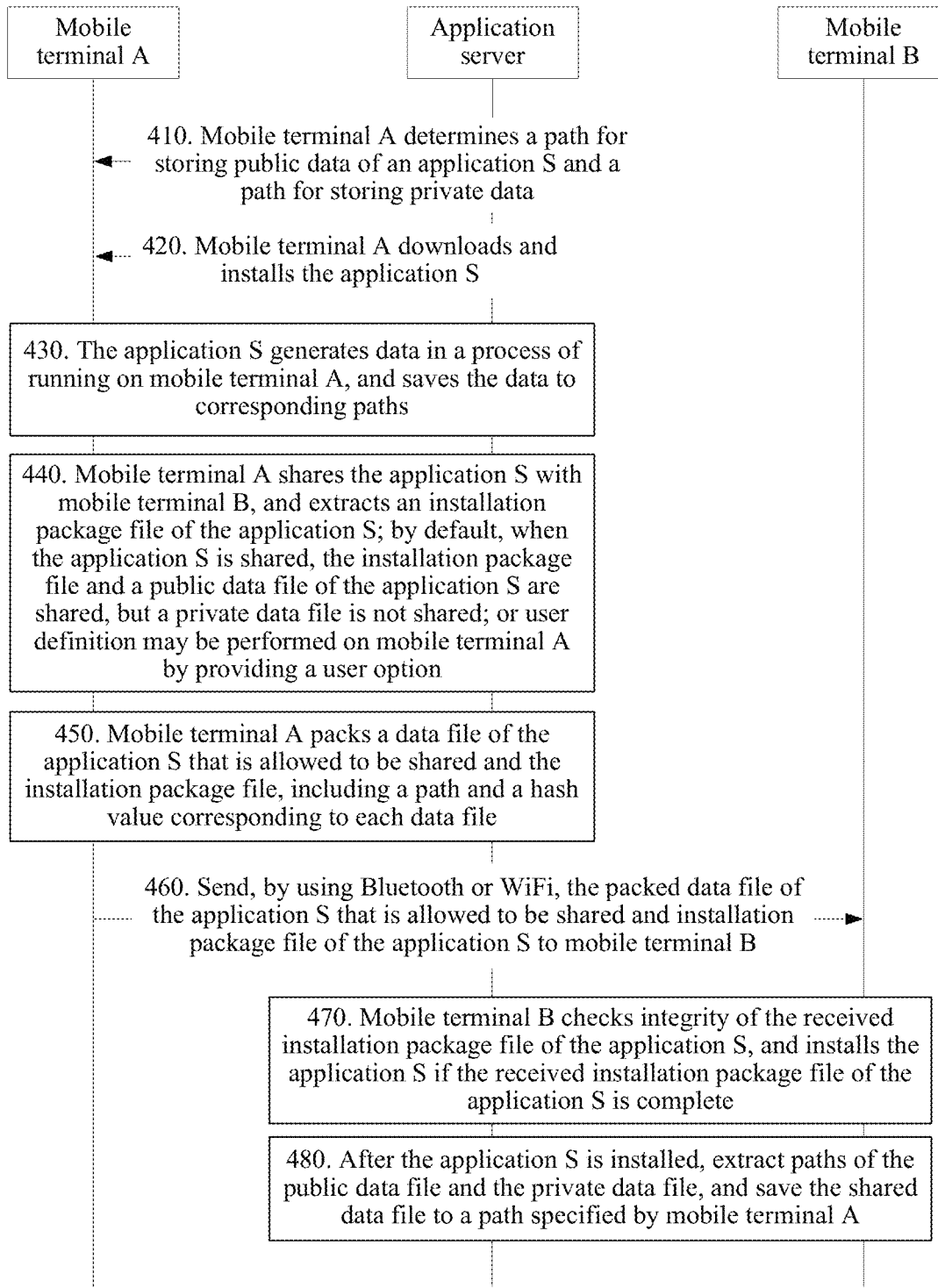
FIG. 4 is a flowchart of a method for sharing an application between terminals according to an embodiment of the present invention.
Figure 5:
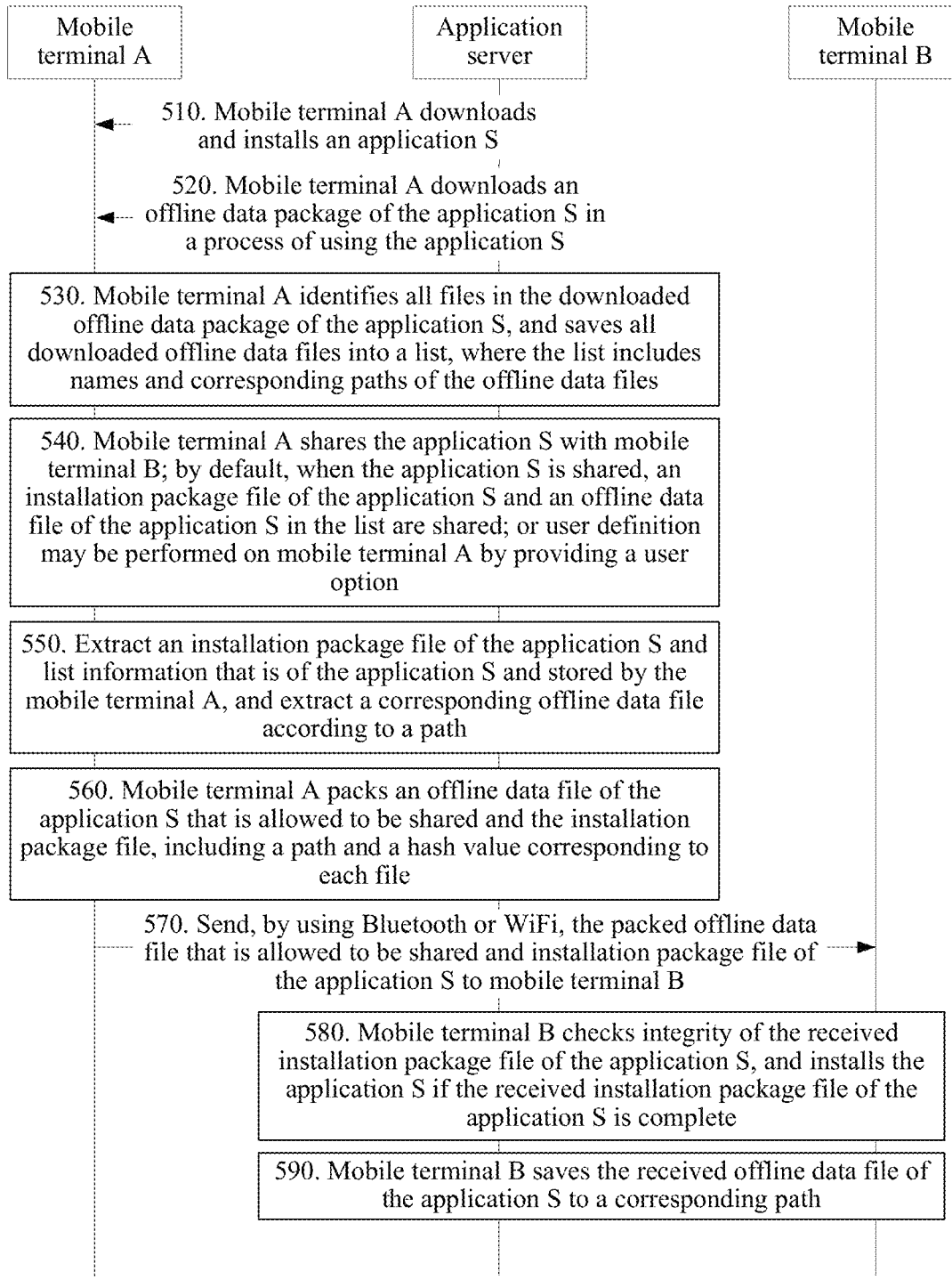
FIG. 5 is a flowchart of a method for sharing an application between terminals according to an embodiment of the present invention.

It should be understood that mobile terminal A in FIG. 3 to FIG. 5 is corresponding to the first terminal in FIG. 1 and FIG. 2, and mobile terminal B is corresponding to the second terminal in FIG. 1 and FIG. 2.

In the embodiments shown in FIG. 3 and FIG. 4, data of an application is separately stored in a public data folder and a private data folder, where the public data folder stores data strongly associated with the application, including the shared data, and the private data folder stores data strongly associated with a user. When the application is shared, all or a part of the public data folder may be shared with a peer end; in addition, a part or all of a private data file may also be shared with the peer end. The embodiments of the present invention do not impose a specific limitation on this. A difference between FIG. 3 and FIG. 4 lies in that storage paths of the public data folder and the private data folder are defined by different entities.

FIG. 3 is a flowchart of a method for sharing an application between terminals according to an embodiment of the present invention. In the method shown in FIG. 3, storage paths of a public data folder and a private data folder are defined in an installation package, that is, corresponding storage paths are generated when the installation package is run.

310. Define, in an installation package of an application S, a path for storing a public data file of the application S and a path for storing a private data file. Data files of the application S are stored to corresponding paths by category.

320. Mobile terminal A downloads and installs the application S.

330. Mobile terminal A generates a data file in a process of running the application S, and mobile terminal A stores the data file that is generated in the process of running the application S to a corresponding path according to a definition of the application S.

340. Mobile terminal A shares, with mobile terminal B, the application S that has been installed, and mobile terminal A extracts an installation package of the application S that is to be shared and that is selected by user A. By default, when mobile terminal A shares the application S with mobile terminal B, the installation package of the application S and all public data files including a configuration file of public data are shared, but a private data file of the application S is not shared. Optionally, mandatory public data files and optional public data files of the application S may be marked in the public data files of the application S; or user definition may be performed on mobile terminal A by providing a user option on a display panel of mobile terminal A, and user A makes an input on mobile terminal A to select a data file of the application S that is to be shared.

350. Mobile terminal A extracts paths of the public data file and a private data file of the application S that is to be shared by user A, and packs a data file of the application S that is allowed to be shared and the installation package file of the application S, including a path and a hash value corresponding to each data file. The packing the data file of the application S that is allowed to be shared may be packing all the public data files of the application S, may be packing a marked mandatory public data file of the application S, or may be packing a data file that are selected by user A on the display panel of mobile terminal A. In addition, packed files include a path and a hash value corresponding to each data file to verify integrity of these data files.

360. Mobile terminal A sends, by using Bluetooth or WiFi, the packed data file of the application S that is allowed to be shared and installation package file of the application S to mobile terminal B.

370. Mobile terminal B checks integrity of the received installation package of the application S, and installs the application S if the received installation package of the application S is complete; or if the received installation package is incomplete, mobile terminal B discards the received installation package, and requests a new installation package from mobile terminal A or ends the operation.

A specific method for checking the integrity of the installation package is: calculating a hash value of a received data file that is of the application S and allowed to be shared; comparing the hash value with a received hash result; and if the calculated hash value is equal to the received hash result, determining that the received data file that is allowed to be shared is complete; or if it is found by comparison that a result obtained by calculation is not equal to the received hash result, determining that the received data file that is allowed to be shared is incomplete.

380. After installing the received application S that is shared, mobile terminal B extracts the paths of the public data file and the private data file of the shared application S, and stores the shared data file to a path defined by the application S.

In this embodiment of the present invention, when sharing an application, two terminals not only share an installation package of the application, but also share data in a public data file and a private data file of the application, which improves flexibility in application sharing.

Further, during application sharing, when shared data includes data downloaded from an application server, a target terminal does not need to acquire the downloaded data from the application server, which reduces traffic of the target terminal and simplifies user operations.

In this embodiment of the present invention, not all steps are mandatory. For example, steps 350, 370, and 380 may not be executed. The basic function that "mobile terminal A shares, with mobile terminal B, an installation package file of an application and a public data file of the application" may be implemented by executing steps 310, 320, 330, 340, and 360 in sequence. If "packing a path and a hash value corresponding to each data file" in step 350 is executed, "verifying integrity of the data file" in step 370 is executed, where the hash value is mainly used to verify the integrity. Step 380 "after installing the received shared application, extracting the paths of files of the shared application, and storing the files to the defined paths by category" is optional; skipping executing step 380 does not affect installation or use of the received shared application by the user; step 380 is executed mainly for preparation for the next sharing.

In a specific implementation manner of the present invention, a storage unit of mobile terminal A is configured to store the installation package file and the data files of the application. The data files of the application include the public data file of the application and the private data file of the application. For example, the installation package of the application is stored in appname.apk of the storage unit, the public data file of the application is stored in a "public data" folder of the storage unit, and the private data file of the application is stored in a "private data" folder of the storage unit.

A processor unit of mobile terminal A is configured to respectively store a generated public data file and private data file to corresponding paths of the storage unit by category in a process of running the application S.

The processor unit of mobile terminal A is further configured to call the installation package file of the application S and the public data file of the application S that are stored in the storage unit. By default, the processor unit of mobile terminal A is configured to call the installation package file of the application S and all public data files of the application S that are stored in the storage unit, including a configuration file of public data, but does not call the private data file of the application S. Optionally, the processor unit of mobile terminal A is also configured to identify mandatory public data files of the application S and optional public data files of the application S from all public data files of the application S; and the processor unit of mobile terminal A is further configured to determine, by identifying an operation of user A on the display panel of mobile terminal A, data files in the storage unit that are to be called.

The processor unit of mobile terminal A is configured to call corresponding paths of the public data file and the private data file of the application S that are stored in the storage unit, and pack a called data file of the application S and installation package file of the application S, including a corresponding path in the storage unit corresponding to each data file and a hash value that is calculated by the processor unit for each data file. That the processor unit of mobile terminal A packs the called data file of the application S may be packing all public data files of the application S, may be packing the mandatory public data files of the application S that are identified by the processor unit, or may be packing data files that are selected by user A using an input unit of mobile terminal A and identified by the processor unit, which are specifically data files that are selected by user A on the display panel of mobile terminal A. In addition, the processor unit of mobile terminal A further includes a verifying module configured to verify integrity of a data file.

Mobile terminal A sends to mobile terminal B, by using a communication unit of mobile terminal A, the packed data file of the application S and installation package file of the application S that are called by the storage unit, where the communication unit may be a Bluetooth module or a WiFi module.

A processor unit of mobile terminal B is further configured to check integrity of the received installation package file of the application S, and install the application S if the received installation package file of the application S is complete; or if the received installation package file is incomplete, the processor unit of mobile terminal B discards the received installation package, and sends, to mobile terminal A, an instruction to request a new installation package file or an instruction to end the operation.

A specific method used by the processor unit of mobile terminal B to check the integrity of the installation package file is: a calculating module of the processor unit of mobile terminal B is configured to calculate a hash value of a data file that is of the application and received by a storage unit of mobile terminal B; comparing the calculated hash value with a hash value that is received by the storage unit; and if the two hash values are equal, determining that the data file received by the storage unit is complete; or if the hash value that is obtained by the calculating module of the processor unit by calculation is not equal to the hash value that is received by the storage unit, determining that the data file received by the storage unit is incomplete.

If a check result of the processor unit of mobile terminal B is that the installation package file is complete, mobile terminal B stores the received data file to a corresponding path on a storage unit of mobile terminal B.

FIG. 4 is a flowchart of a method for sharing an application between terminals according to an embodiment of the present invention. In the method shown in FIG. 4, storage paths of a public data folder and a private data folder are defined by a terminal; that is, the terminal selects a storage path for each folder when running an installation package.

410. Mobile terminal A defines a path for storing public data of an application S and a path for storing private data of the application S. Data files of the application S are stored to corresponding paths by category.

420. Mobile terminal A downloads and installs the application S.

430. Mobile terminal A generates a data file in a process of running the application S, and mobile terminal A stores the data file that is generated in the process of running the application S to a corresponding path according to a definition of mobile terminal A.

440. Mobile terminal A shares, with mobile terminal B, the application S that has been installed, and mobile terminal A extracts an installation package file of the application S that is to be shared and that is selected by user A.

By default, when mobile terminal A shares the application S with mobile terminal B, the installation package file of the application S and all public data files including a configuration file of public data are shared, but a private data file is not shared. Optionally, mandatory public data files and optional public data files of the application S may be marked in the public data files of the application S; or user definition may be performed on mobile terminal A by providing a user option on a display panel of mobile terminal A, and user A makes an input on mobile terminal A to select a data file of the application S that is to be shared.

450. Mobile terminal A extracts paths of the public data file and a private data file of the application S that is to be shared by user A, and packs a data file of the application S that is allowed to be shared and the installation package file of the application S, including a path and a hash value corresponding to each data file.

The packing a data file of the application S that is allowed to be shared may be packing all the public data files of the application S, may be packing a marked mandatory public data file of the application S, or may be packing a data file that is selected by user A on the display panel of mobile terminal A. In addition, packed files include a path and a hash value corresponding to each data file to verify integrity of these data files.

460. Mobile terminal A sends, by using Bluetooth or WiFi, the packed data file of the application S that is allowed to be shared and installation package file of the application S to mobile terminal B.

470. Mobile terminal B checks integrity of the received installation package file of the application S, and installs the application S if the received installation package file of the application S is complete; or if the received installation package file is incomplete, mobile terminal B discards the received installation package file, and requests a new installation package file from mobile terminal A or ends the operation.

A specific method for checking the integrity of the installation package file is: calculating a hash value of a received data file that is of the application S and allowed to be shared; comparing the hash value with a received hash result; and if the calculated hash value is equal to the received hash result, determining that the received data file that is allowed to be shared is complete; or if it is found by comparison that a result obtained by calculation is not equal to the received hash result, determining that the received data file that is allowed to be shared is incomplete.

480. After installing the received application S that is shared, mobile terminal B extracts the paths of the public data file and the private data file of the shared application S, and stores the shared data file to a path defined by mobile terminal A.

In this embodiment of the present invention, when sharing an application, two terminals not only share an installation package of the application, but also share data in a public data file and a private data file of the application, which improves flexibility in application sharing.

Further, during application sharing, when shared data includes data downloaded from an application server, a target terminal does not need to acquire the downloaded data from the application server, which reduces traffic of the target terminal and simplifies user operations.

Likewise, in this embodiment of the present invention, a method for storing data of the application S is described mainly in steps 410, 420, and 430; and a method for sharing the application S is described mainly in steps 440, 450, 460, 470, and 480.

In this embodiment of the present invention, not all steps are mandatory, and adjustment may be made according to an actual condition. For example, steps 450, 470, and 480 may not be executed. The basic function that "mobile terminal A shares, with mobile terminal B, an installation package file of an application and a public data file of the application" may be implemented by executing steps 410, 420, 430, 440, and 460 in sequence. If "packing a path and a hash value corresponding to each data file" in step 450 is executed, "verifying integrity of the data file" in step 470 is executed, where the hash value is mainly used to verify the integrity. "After installing the received application that is shared, extracting the paths of the files of the shared application, and storing the files to the paths defined by mobile terminal A" in step 480 is optional; skipping executing step 480 does not affect installation or use of the received shared application by the user; step 8 is executed mainly for preparation for the next sharing.

FIG. 5 is a flowchart of a method for sharing an application between terminals according to an embodiment of the present invention. In the method shown in FIG. 5, shareable data is not selected by defining a public folder and a private folder. A key point of this embodiment of the present invention is that a mobile terminal identifies all data files in an offline data package that is of an application and downloaded by a user, and saves all downloaded offline data files that are identified into a list. The offline data package indicates that online data is separately packed by function or by category for a user to download. A downloaded offline data package is a compressed package, and a plurality of offline data files included in the offline data package may be shown after the compressed package is opened. After downloading the offline data package, the user's mobile terminal may use a corresponding function of the application without being connected to a network.

510. Mobile terminal A downloads and installs an application S.

520. Mobile terminal A downloads an offline data package of the application S in a process of running the application S.

530. Mobile terminal A identifies all files in the downloaded offline data package of the application S, and saves all downloaded offline data files into a list, where the list includes names and corresponding paths of the offline data files.

540. Mobile terminal A shares the application S with mobile terminal B.

By default, when the application S is shared, an installation package file of the application S and an offline data file that is of the application S and in the list are shared; or user definition may be performed on mobile terminal A by providing a user option on a display panel of mobile terminal A, and user A makes an input on the display panel of mobile terminal A to select an offline data file of the application S that is to be shared.

550. Mobile terminal A extracts an installation package file of the application S to be shared, and extracts a corresponding offline data file according to a path in the list information of the application S stored by mobile terminal A.

560. Mobile terminal A packs an offline data file of the application S that is allowed to be shared and the installation package file, including a path and a hash value corresponding to each file.

Packed files include a path and a hash value corresponding to each file to verify integrity of these files.

570. Mobile terminal A sends, by using Bluetooth or WiFi, the packed offline data file of the application S that is allowed to be shared and installation package file of the application S to mobile terminal B.

580. Mobile terminal B checks integrity of the received installation package file of the application S, and installs the application S if the received installation package file of the application S is complete; or if the received installation package file is incomplete, user B discards the received installation package file of the application S, and requests a new installation package of the application S from mobile terminal A or ends the operation.

A specific method for checking the integrity of the installation package file is: calculating a hash value of a received data file that is of the application S and allowed to be shared; comparing the hash value with a received hash result; and if the calculated hash value is equal to the received hash result, determining that the received data file that is allowed to be shared is complete; or if it is found by comparison that a result obtained by calculation is not equal to the received hash result, determining that the received data file that is allowed to be shared is incomplete.

590. After installing the received application S that is shared, mobile terminal B extracts the paths of the offline data files of the shared application S, and stores the shared offline data file of the application S to a path defined by mobile terminal A.

In this embodiment of the present invention, shareable data may include data downloaded from an application server, and therefore a target terminal does not need to acquire the downloaded data from the application server, which reduces traffic of the target terminal and simplifies user operations.

In this embodiment of the present invention, a method for storing data of the application S is described mainly in steps 510, 520, and 530; and a method for sharing the application S is described mainly in step 540 to step 590.

In this embodiment of the present invention, not all steps are mandatory, and adjustment may be made according to an actual condition. For example, steps 550, 560, 580, and 590 may not be executed. The basic function that "mobile terminal A shares, with mobile terminal B, an installation package file of an application and an offline data file of the application" may be implemented by executing steps 510, 520, 530, 540, and 570 in sequence. If "extracting an installation package file and an offline data file" in step 5 and "packing a path and a hash value corresponding to each data file" in step 560 are executed, "verifying integrity of the data file" in step 580 is executed, where the hash value is mainly used to verify the integrity. "After installing the received application that is shared, extracting the paths of offline data files of the shared application, and storing the offline data files to the paths defined by mobile terminal A" in step 590 is optional; skipping executing step 590 does not affect installation or use of the received shared application by the user; step 590 is executed mainly for preparation for the next sharing.

Specifically, a storage unit of mobile terminal A is configured to store the installation package file of the application S and the offline data file of the application S.

A processor unit of mobile terminal A is configured to download the offline data package of the application S to the storage unit of the application S in a process of running the application S.

The processor unit of mobile terminal A is further configured to identify all files in the downloaded offline data package of the application S, save all downloaded offline data files of the application S into an offline data file list, and store the offline data file list to the storage unit of the application S. The offline data file list includes a name of an offline data file and a corresponding path of the offline data file in the storage unit of the application S.

The processor unit of mobile terminal A is further configured to call the installation package file of the application S and the offline data file in the offline data file list of the application S that are stored in the storage unit.

By default, the processor unit of mobile terminal A is configured to call the installation package file of the application S and all the offline data files in the offline data file list of the application S that are stored in the storage unit. Optionally, the processor unit of mobile terminal A may also be used to determine, by identifying an operation of user A on the display panel of mobile terminal A, offline data files stored in the storage unit that are to be called.

The processor unit of mobile terminal A is further configured to call the installation package file and the offline data file list of the application S that are stored in the storage unit, call, according to a corresponding path in the offline data file list, an offline data file of the application S that is stored in the storage unit, and pack the called installation package file of the application S and offline data file of the application S. In addition, the processor unit of mobile terminal A calculates a hash value of each offline data file. The offline data file that is called and packed by the processor unit of mobile terminal A may be all offline data files in the offline data file list of the application S, or may be an offline data file that is selected by user A using an input unit of mobile terminal A and identified by the processor unit, which is specifically an offline data file that is selected by user A on the display panel of mobile terminal A. In addition, the processor unit of mobile terminal A further includes a verifying module configured to verify integrity of the installation package file and the offline data file.

Mobile terminal A sends to mobile terminal B, by using a communication unit, the packed offline data file of the application S and installation package file of the application S that are called by the storage unit, where the communication unit may be a Bluetooth module or a WiFi module.

A processor unit of mobile terminal B is further configured to check integrity of a received installation package file of the application S, and install the application S if the received installation package file of the application S is complete; or if the received installation package file is incomplete, the processor unit of mobile terminal B discards the received installation package file, and sends, to mobile terminal A, an instruction to request a new installation package file or an instruction to end the operation. A specific method used by the processor unit of mobile terminal B to check the integrity of the installation package file is that: calculating, by a calculating module of the processor unit of mobile terminal B, a hash value of a data file that is of the application S and received by a storage unit of mobile terminal B; comparing the calculated hash value with a hash value that is received by the storage unit; and if the two hash values are equal, determining that the data file received by the storage unit is complete; or if the hash value that is obtained by the calculating module of the processor unit by calculation is not equal to the hash value that is received by the storage unit, determining that the data file received by the storage unit is incomplete. If a check result of the processor unit of mobile terminal B is that the installation package file is complete, mobile terminal B stores the received offline data file to a corresponding path on a storage unit of mobile terminal B.

The foregoing describes in detail, with reference to FIG. 3 to FIG. 5, a method for sharing a citation. The following provides an embodiment of a UI implementation according to an embodiment of the present invention.

Figure 6:
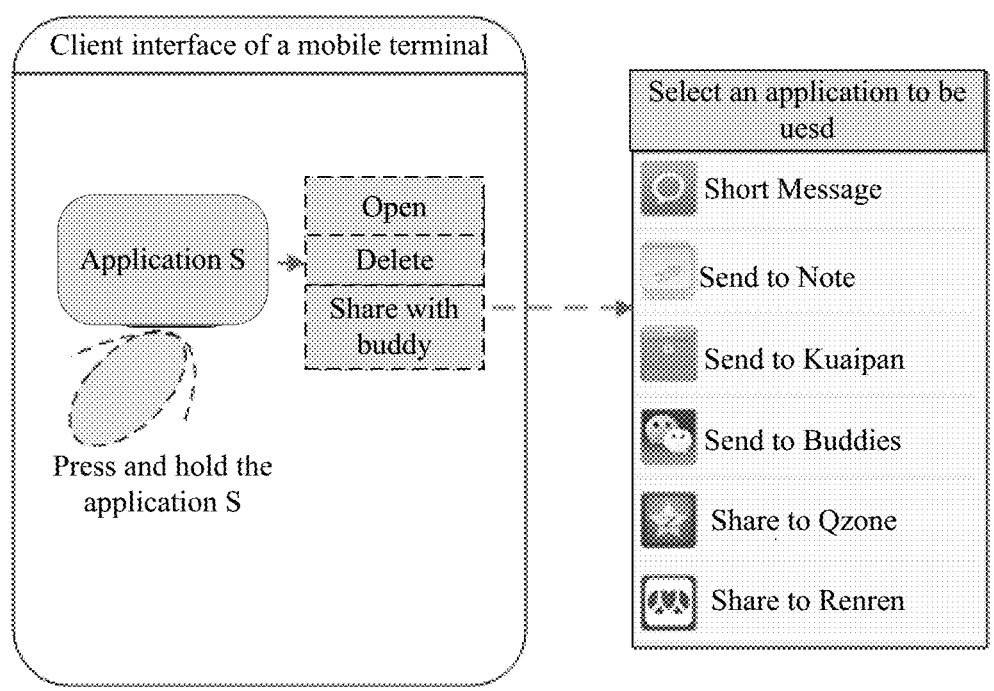
FIG. 6 is a UI scenario diagram of application sharing according to an embodiment of the present invention.

FIG. 6 is a UI scenario diagram of application sharing according to an embodiment of the present invention. Specific steps are as follows:

Step 1: After mobile terminal A acquires an operation that user A presses and holds an icon of an application S on a display panel of mobile terminal A, the display panel of mobile terminal A presents a "share with buddy" label to prompt the user to share the application.

Step 2: After mobile terminal A acquires an operation that user A selects the "share with buddy" label on the display panel of mobile terminal A, the display panel of mobile terminal A presents a list of communications links for the user to select, so that user A may share the application S with user B by selecting a communications link presented on the display panel of mobile terminal A.

Step 3: After mobile terminal A detects that user A selects a communications link, mobile terminal A extracts an installation package file of the application S and a public data file of the application S, packs the installation package file of the application S and the public data file of the application S, and sends the packed installation package file of the application S and public data file of the application S to mobile terminal B of user B through the communications link that is selected by user A on the display panel of mobile terminal A, thereby achieving a purpose of sharing the application.

In the prior art, like Google Play, Amazon and Tencent application stores also have many quality applications; however, it is still very risky for a user to directly download an Android application from the Internet because there may also be much malicious software and many pirated applications, though many high quality applications are available on the Internet. Therefore, Google announced a modification to its application store policy that Google play prohibits automatic update of all applications.

According to an existing application recommendation solution (for example, by pushing an application link or transferring an application installation package), it may be implemented that a terminal recommends and shares an application to a specific user.

The terminal cannot ensure that an application that it recommends is from a legal source (for example, a non-official application), and a particular security risk may be imposed on the terminal after the application is installed.

Figure 7:
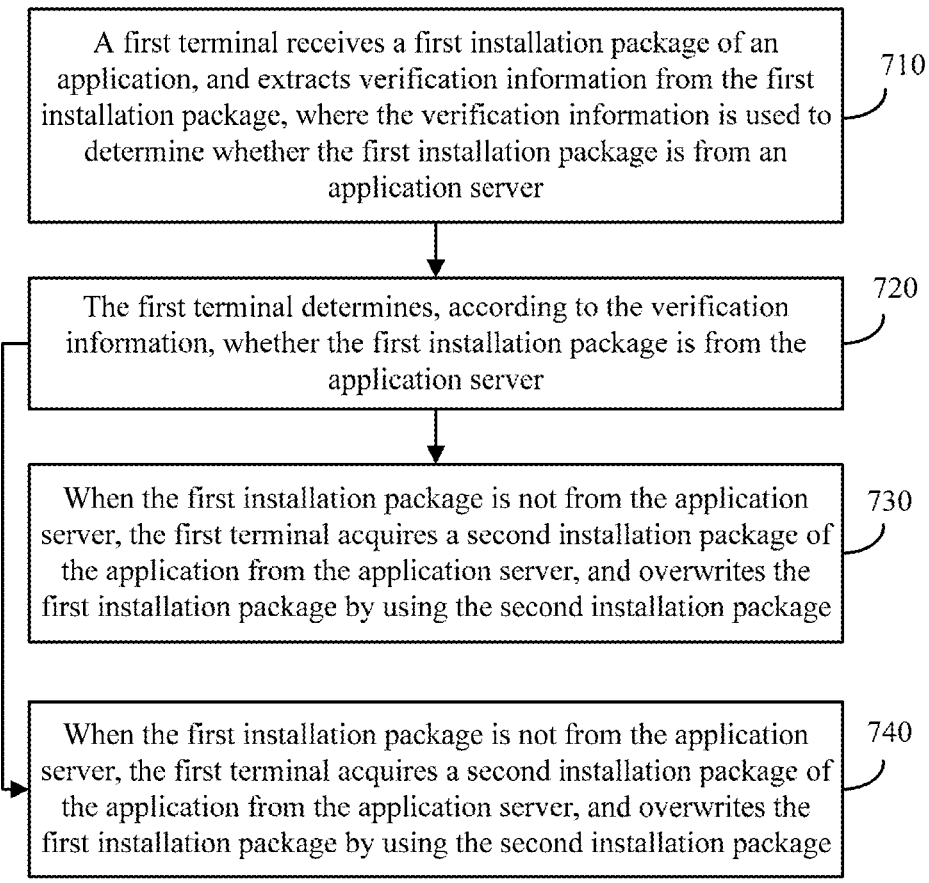
FIG. 7 is a schematic flowchart of a method for verifying application security according to an embodiment of the present invention.

FIG. 7 is a schematic flowchart of a method for verifying application security according to an embodiment of the present invention. The method shown in FIG. 7 includes the following steps:

710. A first terminal receives a first installation package of an application, and extracts verification information from the first installation package, where the verification information is used to determine whether the first installation package is from an application server.

This embodiment of the present invention imposes no specific limitation on a source of the first installation package of the first terminal, for example, the first installation package may be received from another terminal or be downloaded from another path.

720. The first terminal determines, according to the verification information, whether the first installation package is from the application server.

Optionally, each genuine installation package includes particular identification information, and the first terminal extracts the identification information from the first installation package to verify its validity, so as to determine whether the first installation package is from the application server; or, the first terminal extracts information such as a signature, a digital certificate, and a hash value of the first installation package, and sends the information to the application server, so that the application server extracts information corresponding to the information from a genuine installation package, and performs a comparison to determine whether the first installation package is a genuine installation package (that is, whether it is from the application server).

730. When the first installation package is not from the application server, the first terminal acquires a second installation package of the application from the application server, and overwrites the first installation package by using the second installation package.

740. When the first installation package is from the application server, the first terminal runs the first installation package.

In this embodiment of the present invention, after acquiring an installation package, a first terminal extracts verification information from the installation package, and verifies, according to the verification information, whether the installation package is from an application server, which improves security of application installation.

Optionally, according to an embodiment, step 720 may include: sending the verification information to the application server, so that the application server checks, according to a match between the verification information and source information, whether the first installation package is from the application server, where the source information is extracted by the application server from a second installation package; and receiving a check result of the application server.

Figure 8:
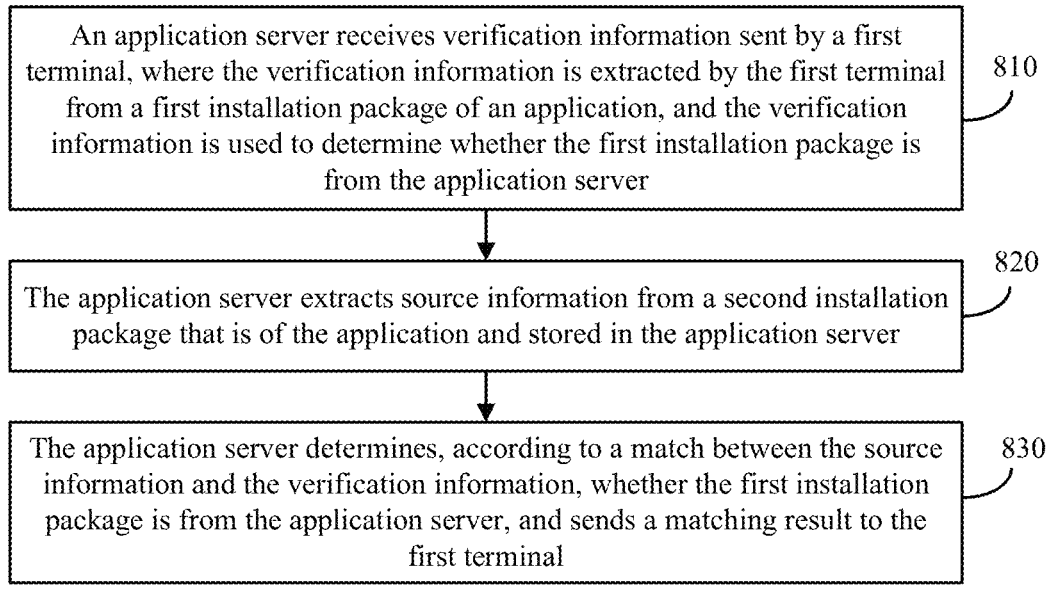
FIG. 8 is a schematic flowchart of a method for verifying application security according to an embodiment of the present invention.

FIG. 8 is a schematic flowchart of a method for verifying application security according to an embodiment of the present invention. The method shown in FIG. 8 includes the following steps:

810. An application server receives verification information sent by a first terminal, where the verification information is extracted by the first terminal from a first installation package of an application, and the verification information is used to determine whether the first installation package is from the application server.

820. The application server extracts source information from a second installation package that is of the application and stored in the application server.

830. The application server determines, according to a match between the source information and the verification information, whether the first installation package is from the application server, and sends a matching result to the first terminal.

In this embodiment of the present invention, after acquiring a first installation package, a first terminal extracts verification information from the first installation package, and sends the verification information to an application server; the application server checks, according to a match between the verification information and source information, whether the first installation package is from the application server, which improves security of application installation.

The following describes in more detail, with reference to specific examples, the embodiments of the present invention. It should be noted that examples in FIG. 9 to FIG. 12 are merely provided to help a person skilled in the art understand the embodiments of the present invention, but are not intended to limit the embodiments of the present invention to an exemplary specific value or specific scenario. It is obvious that a person skilled in the art may perform various equivalent modifications or alterations according to the examples provided in FIG. 9 to FIG. 12, and the modifications or alterations also fall within the scope of the embodiments of the present invention.

Figure 9:
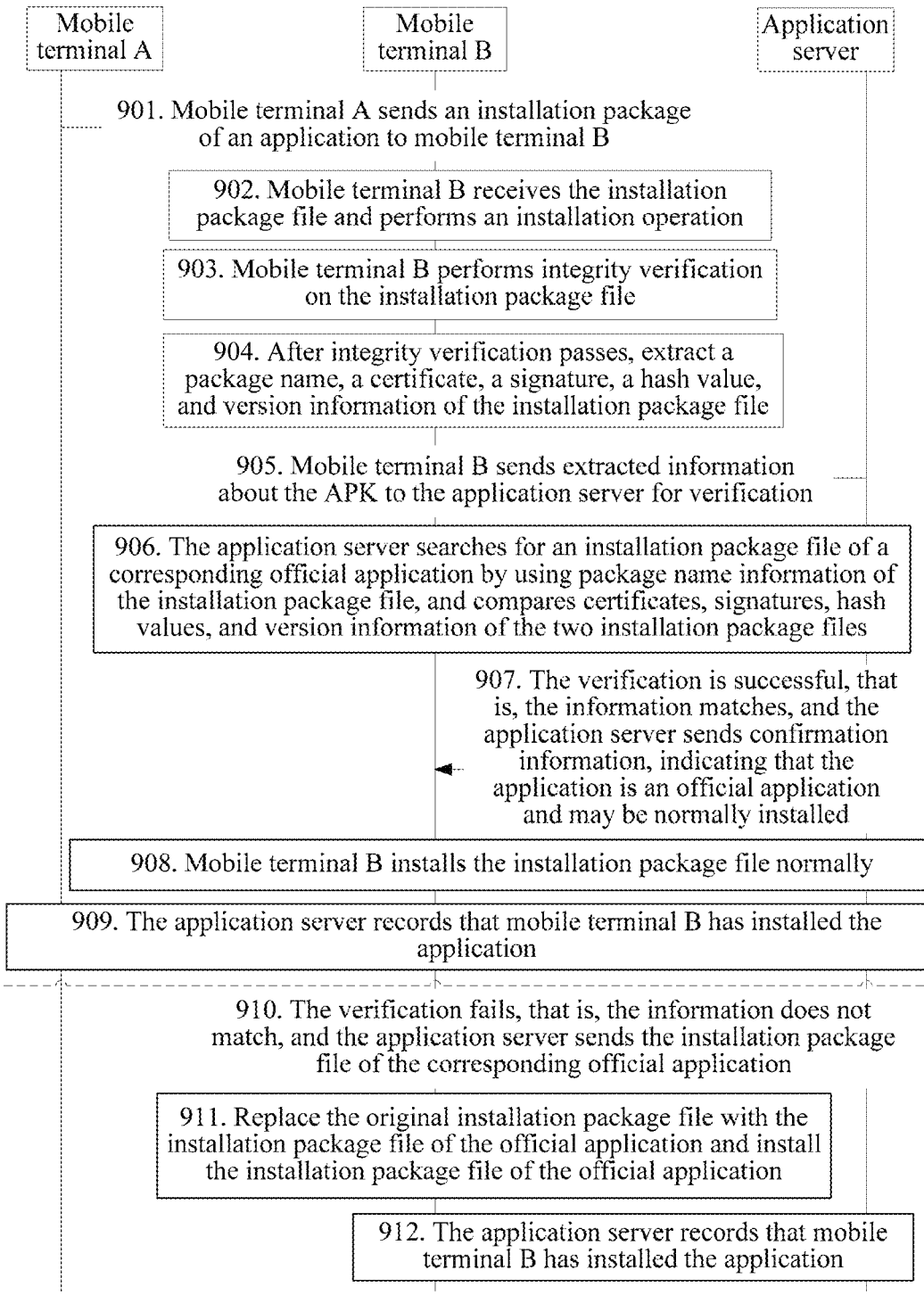
FIG. 9 is a flowchart of a method for verifying application security according to an embodiment of the present invention.

FIG. 9 is a flowchart of a method for verifying application security according to an embodiment of the present invention. A key point of Embodiment 4 of the present invention is that: a mobile terminal verifies an acquired installation package file, where the verification mentioned herein may include integrity verification performed by the mobile terminal on the installation package and validity verification performed by an application server on the installation package. The integrity verification means that the mobile terminal verifies an acquired application installation package, so as to ensure that the installation package has not been tampered with maliciously. The validity verification means that the application server verifies information about the installation package file that is uploaded by the mobile terminal by comparison with a genuine application installation package file to rule out an installation package file of a pirated application. The method includes the following steps:

901. Mobile terminal B acquires an installation package file of an application, where the installation package file is not downloaded from an official application server, and may be an installation package file that is shared by another mobile terminal with mobile terminal B, or may be acquired from another path (for example, a third-party application server).

902. Mobile terminal B executes an installation operation for the acquired installation package file of the application.

903. Before the installation begins, mobile terminal B performs integrity verification on the installation package file.

904. After successfully verifying integrity of the installation package file, mobile terminal B extracts related information of the installation package file (the related information may be a package name, a signature, certificate information, a hash value, version information, or the like of the installation package file).

905. Mobile terminal B sends information extracted in the previous step to a corresponding application server for subsequent verification processing.

906. The application server receives the information that is extracted by mobile terminal B and that is about the installation package file, and performs validity verification on the installation package file.

Figure 10:
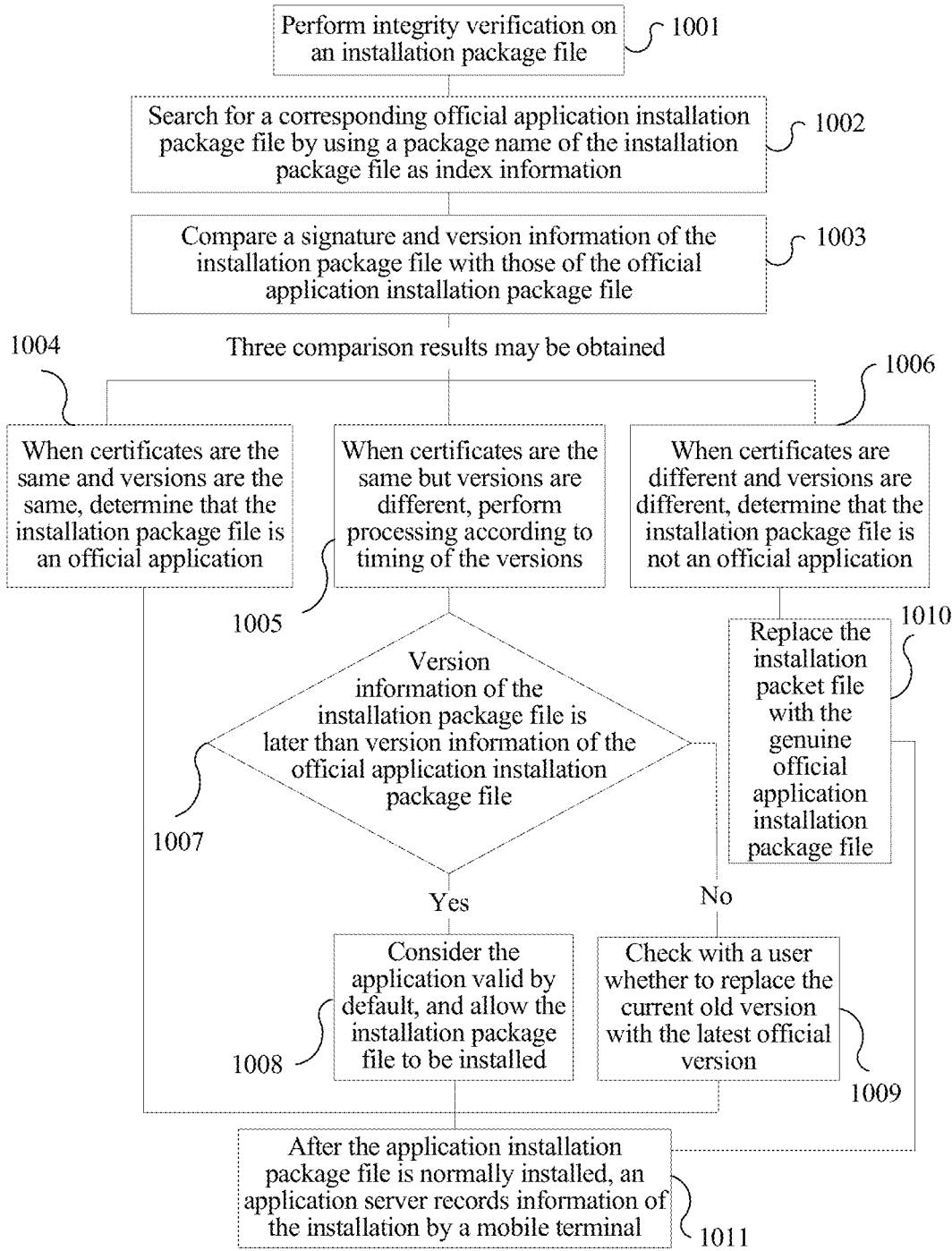
FIG. 10 is a flowchart of determining that an application is an official citation according to an embodiment of the present invention.

Reference may be made to FIG. 10 for a comparison in step 906.

907. If the installation package file of mobile terminal B passes the validity verification of the application server, the application server sends confirmation information to mobile terminal B, indicating that the installation package file of the application is a genuine application and may be installed normally.

908. Mobile terminal B installs the installation package file of the application normally.

909. After mobile terminal B installs the installation package file of the application, the application server records valid installation of mobile terminal B, so as to facilitate a subsequent operation related to the application (such as pushing update and upgrade messages).

910. If the installation package file of mobile terminal B does not pass the validity verification of the application server, the application server sends a related indication to mobile terminal B (for example, indicating that the installation package file of the application does not match an installation package file of a genuine application), and sends an installation package file of a corresponding genuine application.

911. Mobile terminal B receives and installs the installation package file that is of the genuine application and provided by the application server.

912. After mobile terminal B installs the installation package file of the genuine application, the application server records valid installation by mobile terminal B, so as to facilitate a subsequent operation related to the application (such as pushing update and upgrade messages).

In this embodiment of the present invention, after acquiring an installation package, a target terminal extracts verification information from the installation package, and checks with a citation server side whether the installation package is an official application, which improves security of application installation.

In this embodiment shown in FIG. 9, the basic function that "mobile terminal B receives an installation package file that is of an application and sent by mobile terminal A, and sends the installation package to an application server for validity verification; and if the installation package is valid, installs the installation package normally; or if the installation package file is invalid, replaces it with an installation package file of a genuine installation package file" may be implemented by executing steps 901, 902, 904, 905, 906, 907, 908, and 909 in sequence. Step 902 in which "mobile terminal B performs integrity verification on the acquired installation package file of the application" is optional and does not affect the execution of the solution; however, after step 902 is executed, it may be ensured that the installation package that is of the application and received by mobile terminal B has not been tampered with in a transfer process.

Specifically, a memory unit of mobile terminal A is configured to store an application installation package file that has been installed or has not been installed on mobile terminal A, and the application installation package file is corresponding to a corresponding storage path.

A processor unit of mobile terminal A is configured to transfer, according to a storage path of an application installation package, an application installation package file that is stored in the memory unit of mobile terminal A to an output unit of mobile terminal A. In this process, an operation that mobile terminal A sends an application installation package file to mobile terminal B is implemented.

An input unit of mobile terminal B is configured to receive the application installation package file sent by mobile terminal A, and transfers the application installation package file to a processor unit on mobile terminal B for processing.

The processor unit of mobile terminal B includes an extracting module, a verifying module, an installation module, and the like.

The processor unit of mobile terminal B is configured to the installation package file that is acquired by the input unit, where the verifying module in the processor unit is configured to extract related information of the installation package file for integrity verification, and after the verification is successful, the verifying module transfers the installation package file to an output unit of mobile terminal B. The related information may be a hash value, public key information, or the like of the installation package file.

The output unit of the processor unit of mobile terminal B sends the installation package file to the application server for validity verification.

FIG. 10 is a flowchart of determining that an application is an official application according to an embodiment of the present invention, including:

1001. Perform integrity verification on an installation package file.

1002. Search for a corresponding official application installation package file by using a package name of the installation package file as index information.

1003. Compare a signature and version information of the installation package file with those of the official application installation package file.

1004. When certificates are the same and versions are the same, determine that the installation package file is an official application.

1005. When certificates are the same but versions are different, perform processing according to timing of the versions.

1006. When certificates are different and versions are different, determine that the installation package file is not an official application.

1007. Determine whether version information of the installation package file is later than version information of the official application installation package file.

1008. Consider the application valid by default and allow the installation package file to be installed.

1009. Check with a user whether to replace the current old version with the latest official version.

1010. Replace the installation package file with a genuine official application installation package file.

1011. After the application installation package file is normally installed, an application server records information of the installation by a mobile terminal.

Figure 11:
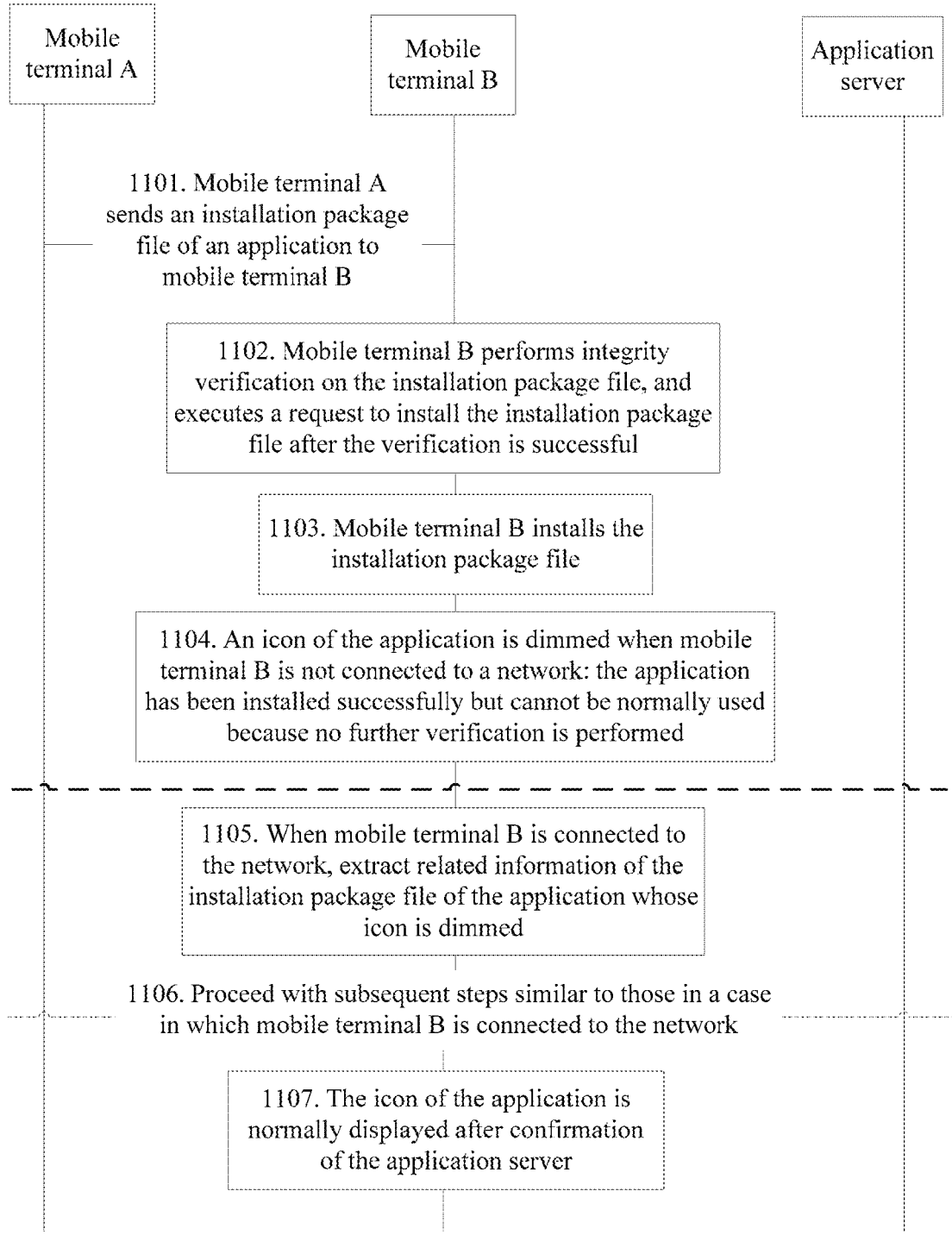
FIG. 11 is a flowchart of a method for verifying application security according to an embodiment of the present invention.

FIG. 11 is a flowchart of a method for verifying application security according to an embodiment of the present invention. A key point of this embodiment of the present invention is that: in a case in which a mobile terminal is not connected to a network, the mobile terminal performs integrity verification on an acquired installation package file and installs the application installation package file; however, because the mobile terminal is not connected to the network, the application that has been installed cannot be normally used, and the application can be normally used only after the mobile terminal is connected to the network and an application server performs validity verification.

1101. Mobile terminal B acquires an installation package file of an application, where the installation package file is not downloaded from an official application server, and may be an installation package that is shared by another mobile terminal, or may be acquired from another path (for example, a third-party application server).

1102. Mobile terminal B performs an installation operation on the acquired installation package file of the application; before the installation begins, mobile terminal B performs integrity verification on the installation package file.

1103. Mobile terminal B installs the installation package file of the application.

1104. Because validity verification has not been performed on the installation package file (mobile terminal B is not connected to the network), after the installation, an icon of the application is dimmed and the application cannot be normally used; mobile terminal B records the dimmed application for subsequent validity verification when mobile terminal B is connected to the network.

1105. After mobile terminal B is connected to the network, mobile terminal B sends related information (such as a package name, a signature, certificate information, a hash value, version information, and the like of the installation package) of the application whose icon is dimmed to an application server for validity verification.

1106. The validity verification after mobile terminal B is connected to the network is similar to the case of the embodiment shown in FIG. 9, and reference may be made to the embodiment shown in FIG. 9.

1107. After confirmation and recording by the application server, the application whose icon is dimmed is normally displayed and the application may be normally used.

In this embodiment of the present invention, the basic function that "when mobile terminal B is not connected to a network, mobile terminal B receives and installs an installation package file of an application from mobile terminal A; however, because validity verification has not been performed by an application server, the application that has been installed cannot be normally used; the installation package file is sent to the application server for validity verification after mobile terminal B is connected to the network; the installation package file is normally installed if the installation package file is valid, or is replaced with a genuine installation package file of the application if the installation package file is invalid" may be implemented by executing steps 1101, 1103, 1104, 1105, 1106, and 1107 in sequence. Step 1102 in which "mobile terminal B performs integrity verification on the acquired installation package file of the application" is optional and does not affect the execution of the solution; however, after step 1102 is executed, it may be ensured that the installation package of the application received by mobile terminal B has not been tampered with in a transfer process.

Figure 12:
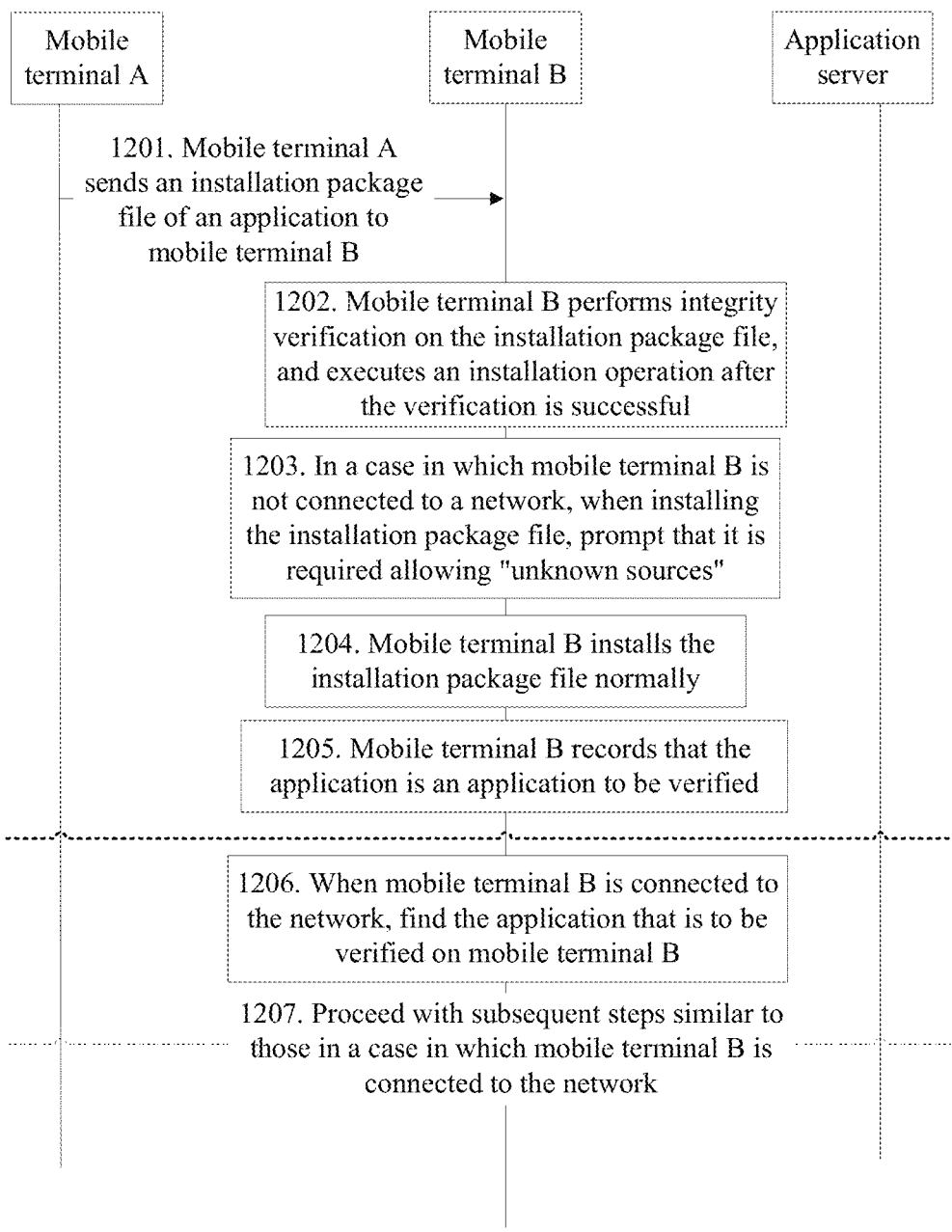
FIG. 12 is a flowchart of a method for verifying application security according to an embodiment of the present invention.

FIG. 12 is a flowchart of a method for verifying application security according to an embodiment of the present invention. A key point of this embodiment of the present invention is that, in a case in which a mobile terminal is not connected to a network, the mobile terminal performs integrity verification on an acquired installation package file and installs the installation package file of an application, and the application that has been installed can be normally used. However, because the mobile terminal is not connected to the network, the mobile terminal needs to record the application as not verified, and an application server will perform validity verification after the mobile terminal is connected to the network.

1201. Mobile terminal B acquires an installation package file of an application, where the installation package file is not downloaded from an official application server, and may be an installation package file that is shared by another mobile terminal, or may be acquired from another path (for example, a third-party application server).

1202. Mobile terminal B performs an installation operation on the acquired installation package file of the application; before the installation begins, mobile terminal B performs integrity verification on the installation package file.

1203. When mobile terminal B installs the installation package file of the application, mobile terminal B prompts that it is required enabling "allow installation from unknown sources" (by default, this setting is disabled on a mobile terminal).

1204. Mobile terminal B installs the application, and the application may be normally used after the installation.

1205. Mobile terminal B records the application that is installed when mobile terminal B is not connected to the network, and performs subsequent validity verification after mobile terminal B is connected to the network.

1206. After mobile terminal B is connected to the network, mobile terminal B sends related information (such as a package name, a signature, certificate information, a hash value, version information, and the like of the installation package) of the application that is recorded in step 1205 to an application server for validity verification.

1207. The validity verification after mobile terminal B is connected to the network is similar to the case of the embodiment shown in FIG. 9.

In this embodiment of the present invention, the basic function that "when mobile terminal B is not connected to the network, mobile terminal B receives and installs an installation package file of an application from mobile terminal A, and the application may be normally used after the installation; however, because validity verification has not been performed by an application server, the installation package file is sent to the application server for validity verification after mobile terminal B is connected to the network; the application may be continue to be used normally if the installation package file is valid, and is replaced with a genuine installation package file of the application if the installation package file is invalid" may be implemented by executing steps 1201, 1203, 1204, 1205, 1206, and 1207 in sequence. Step 1202 in which "mobile terminal B performs integrity verification on the acquired installation package file of the application" is optional and does not affect the execution of the solution; however, after step 1202 is executed, it may be ensured that the installation package of the application received by mobile terminal B has not been tampered with in a transfer process.

In the prior art, increasing electronic mobile terminals use an Android operating system. According to the latest statistics of the survey institute IDC, Android systems have taken 75% share of the global smartphone market by the third quarter. Android is of open source and free of charge. Therefore, manufacturers may define different ROMs according to their requirements, and developers may compile systems according to open source code of the manufacturers. This makes the overall Android market more flourishing, and some developers may re-sign some applications when compiling systems.

Google Play is an official application market that is established by Google for the Android platform. In addition, Google allows existence of third-party application stores. For example, in China, application markets such as Gfan Market, Anzhi Market, MINU App Store, Smart Cloud Market, and Baidu Market emerge one after another. A developer may submit an application to a plurality of markets, while each market has an independent submission and check mechanism. The developer may submit different applications to different markets, and current online applications may also be different because of reasons such as examination, including different versions, digital certificates for signatures, and the like.

In Android, all applications may be normally installed only after being signed. A process of signing is: first, compile an application into a zip file package; then, perform hashing on all files in the file package, and record all hash values by using a MANIFEST. MF file; then, perform hashing on the MANIFEST.MF file and all hash values in the file, and record obtained hash values by using a CERT.SF; and finally, encrypt records in *.SF by using a private key in a digital certificate, and store an encryption result and digital certificate information (a public key and other basic information of the digital certificate) in an *.RSA file. (* is generally a name of a digital certificate.)

In the prior art, if a terminal receives a new version of an application, for example, when a package name, a version number, or a digital signature certificate, or the like of the application is updated, the terminal stores both the old version and a new version, which wastes storage resources.

Figure 13:
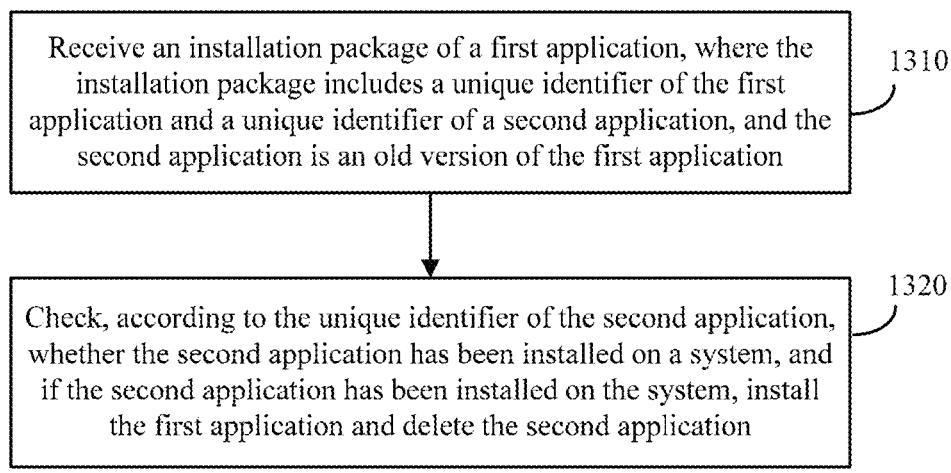
FIG. 13 is a schematic flowchart of a method for processing an application according to an embodiment of the present invention.

FIG. 13 is a schematic flowchart of a method for processing an application according to an embodiment of the present invention. The method shown in FIG. 13 may be executed by a terminal. The method includes the following steps:

1310. Receive an installation package of a first application, where the installation package includes an identifier of the first application and an identifier of a second application, and the second application is an old version of the first application; for example, the identifier of the first application may be a unique identifier of the first application, and the identifier of the second application may be a unique identifier of the second application.

1320. Check, according to the identifier of the second application, whether the second application has been installed on a system, and if the second application has been installed on the system, install the first application and delete the second application.

In this embodiment of the present invention, when an installation package of a first application is received, whether an old version of the first application has been installed on a system is checked according to an identifier of the old version carried in the installation package; and when the old version of the application is detected, the old version of the application is deleted, which saves storage resources of a terminal.

Figure 14:
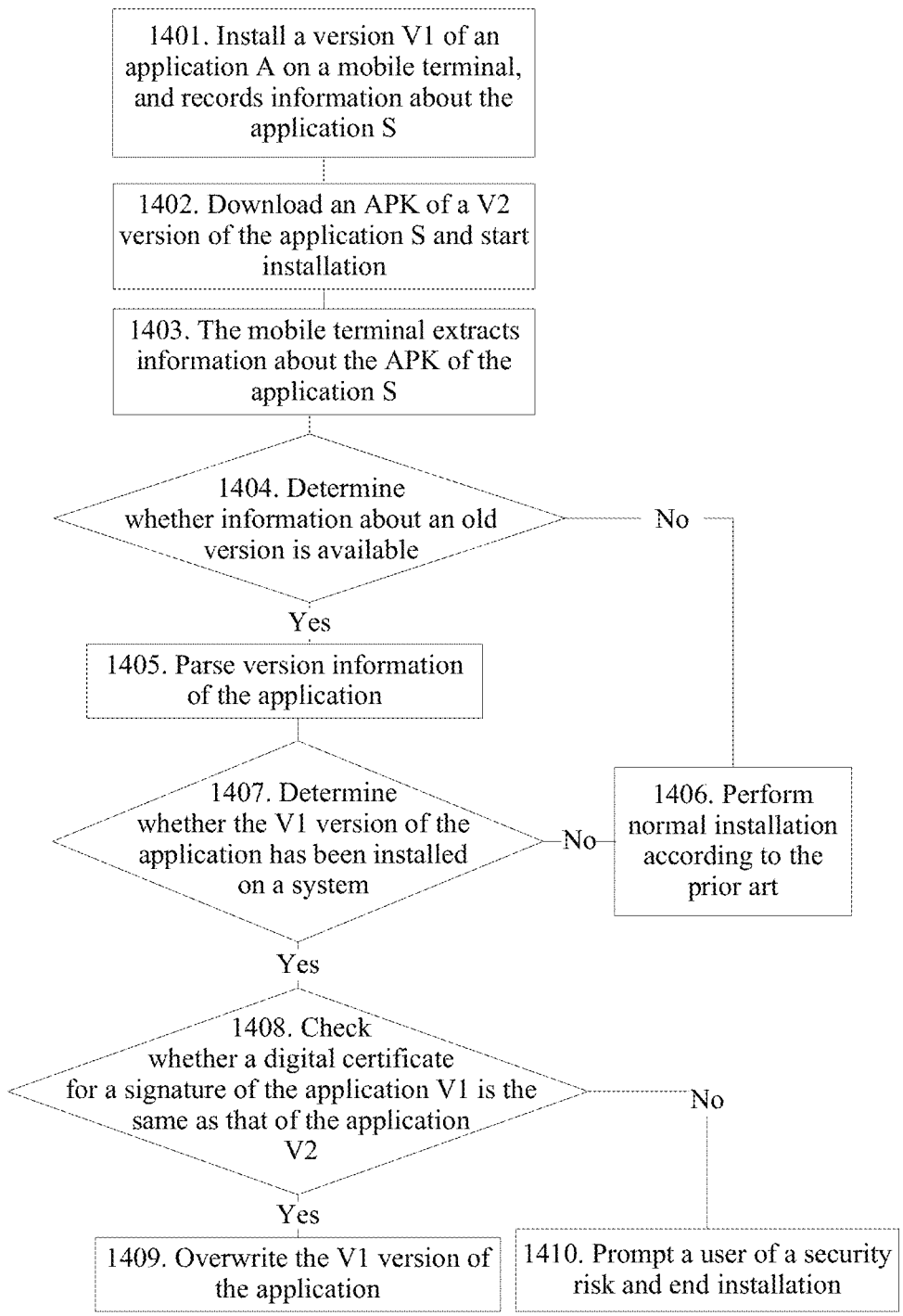
FIG. 14 is a flowchart of a method for processing an application according to an embodiment of the present invention.
Figure 15:
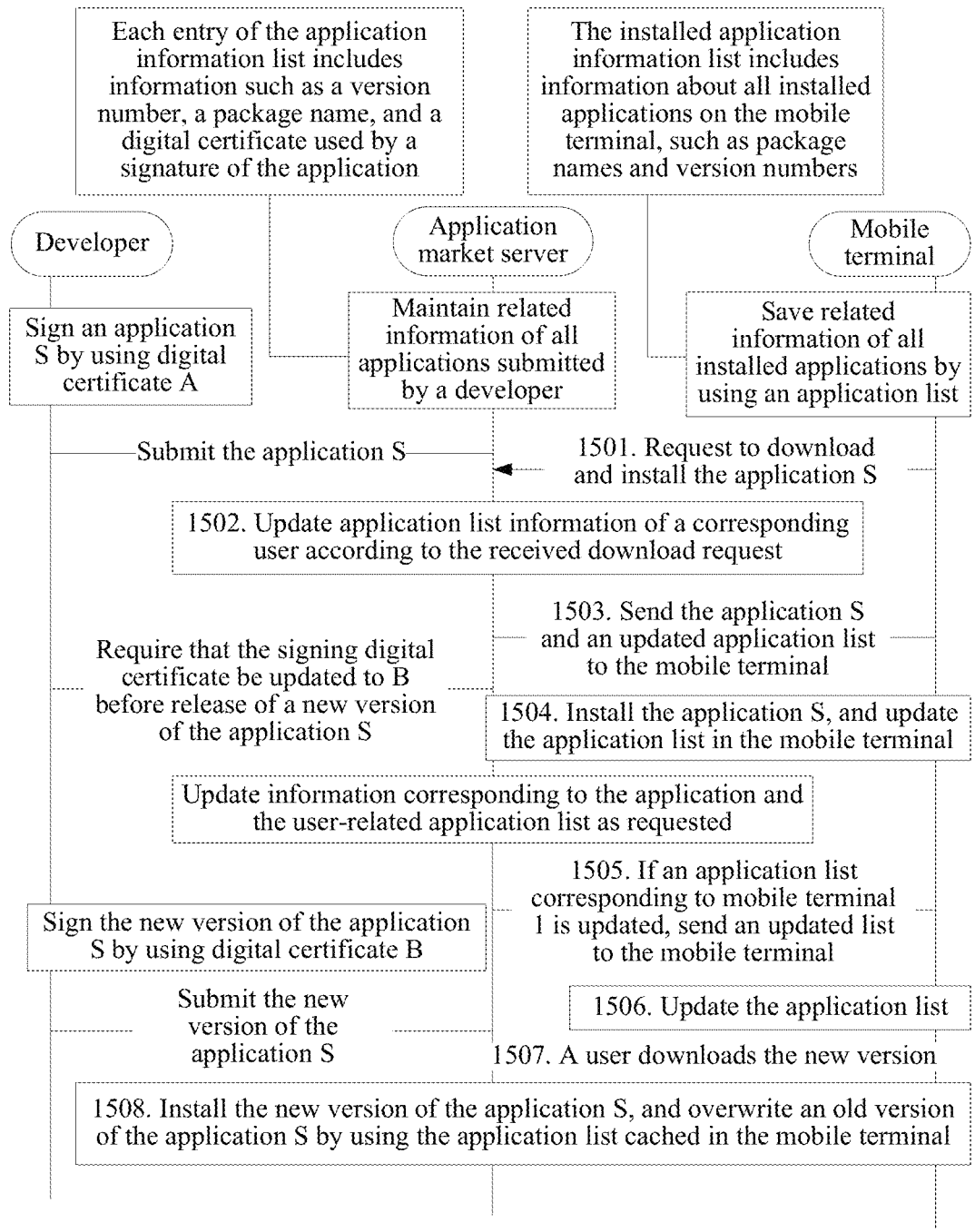
FIG. 15 is a flowchart of a method for processing an application according to an embodiment of the present invention.
Figure 16:
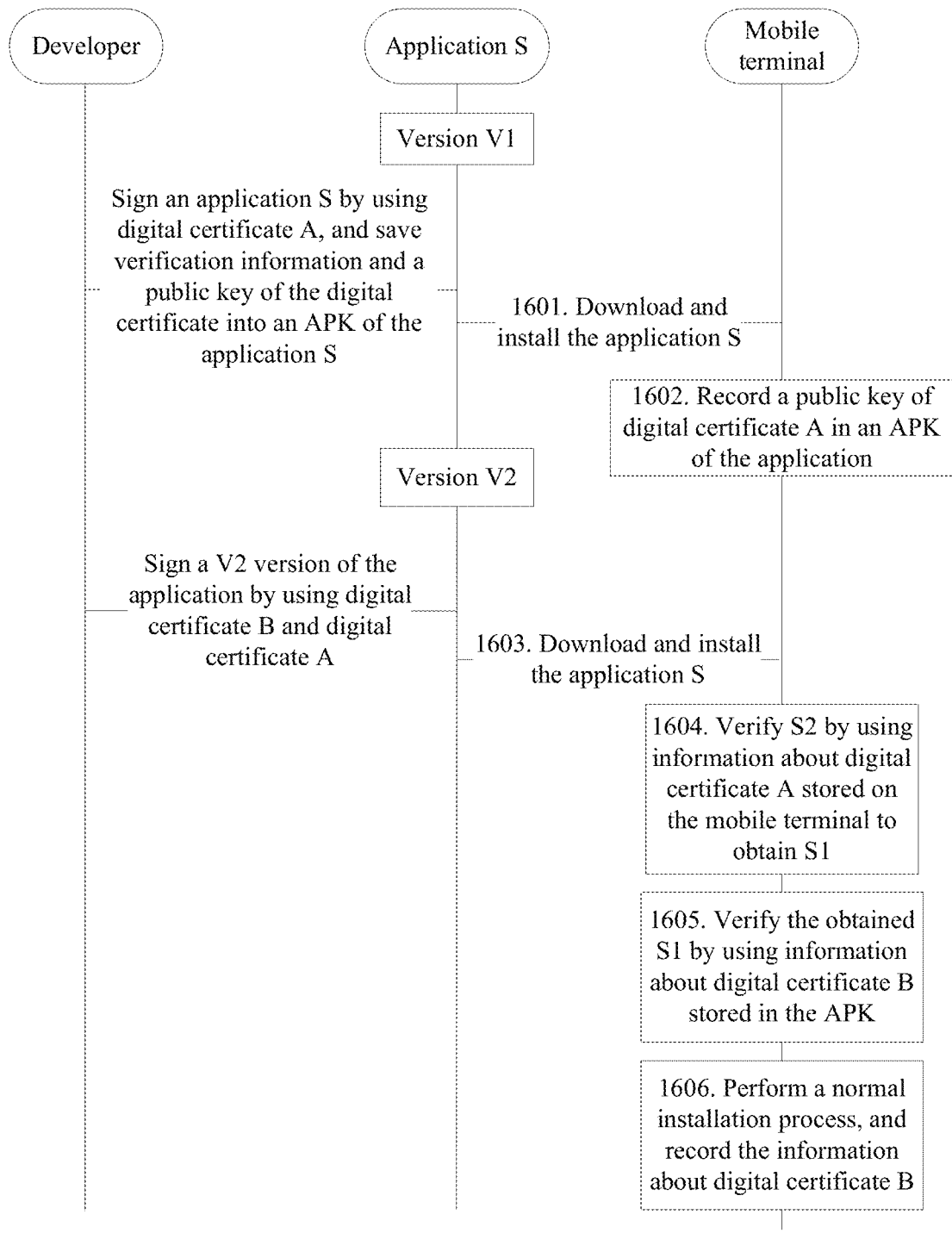
FIG. 16 is a flowchart of a method for processing an application according to an embodiment of the present invention.

The following describes in detail, with reference to FIG. 14 to FIG. 16, how to determine that a received application is a new version of an application that has been stored in a terminal.

FIG. 14 is a flowchart of a method for processing an application according to an embodiment of the present invention. The method shown in FIG. 14 includes the following steps:

1401. Install a version V1 of an application S on a mobile terminal, and record information about the application S, including information such as a package name, a version number, and a digital certificate for signing, where the version V1 of the application S uses a package name APP_S and is signed by a developer by using a digital certificate.

1402. Download an APK for installation of a version V2 of the application S and start installation, where the version V2 of the application S uses a package name APP_S2; a label<old_package android:name="APP_S"version: name="1.0"> is added by a developer to indicate a package name and a version number of a previous version of the application S; and the V2 is signed by using a digital certificate C.

1403. The mobile terminal extracts information about the APK of the version V2 of the application S.

1404. Determine, according to whether the <old_package> label is present, whether information about an old version is available; if the information about the old version is available, go to 1405; or if the information about the old version is unavailable, go to 1406.

1405. Parse information about the old version to acquire information such as a package name, a version number, and a signing digital certificate of the old version.

1406. Perform normal installation according to the prior art.

1407. Determine whether the V1 version of the application has been installed on a system.

1408. Check whether a signing digital certificate of the V1 version of the application is the same as that of the V2 version of the application; if they are the same, go to step 1409; if they are different, go to step 1410.

1409. Overwrite the V1 version of the application, and record, in the system, information about the V2 version.

1410. Prompt a user of a security risk of the application that is being installed, and end the installation.

In this embodiment of the present invention, that "a mobile terminal installs in a overwriting manner a new version of an application S whose package name is changed" may be implemented by executing steps 1401, 1402, 1403, 1404, 1405, 1407, 1408, and 1409 in sequence; step 1410 is performed to provide an additional prompt to a user when a signature of a version V2 of the application S is different from that of a version V1. It is acceptable if no prompt is provided to the user.

Specifically, the following modules of the terminal may be used to perform operations of the foregoing process: a downloading module of a processing unit is configured to download the APK of the application S; an installation module of the processing unit is configured to install the application S after the downloading module downloads the APK of the application S; an extracting module of the processing unit is configured to extract information about the APK of the application S after the installation module starts installing the application S; a parsing module of the processing unit is configured to parse version information that is of the APK of the application S and extracted by the extracting module; a determining module of the processing unit is configured to determine, according to the information about the APK of the application S that is parsed by the parsing module, whether the V1 version of the application S has been installed on the system, and if the V1 version of the application S has been installed, activate a checking module of the processing unit; the checking module of the processing unit is configured to check whether a signature of the V1 version of the application S is the same as that of a V2 version of the application S; a user prompting module of the processing unit is configured to correspondingly prompt a user when the checking module detects a risk of the application; and a communication unit of the mobile terminal is configured to provide a network connection for the downloading module of the processing unit to download the APK of the application S.

The following provides a method for processing an application, including: maintaining, by an application server, a first application list, where the application list includes basic information of an application on the application server, and the basic information includes one or more of the following information about the application: a version number, a newspaper name, a signature, and a digital certificate; when the basic information of a first application is updated, updating, by the application server, the basic information of the first application in the first application list; and sending, by the application server, information to a terminal on which the first application has been installed, where the information is used to instruct the terminal to update the basic information of the first application.

The following provides another method for processing an application, including: maintaining, by a terminal, a second application list, where the second application list includes basic information of an application on the terminal, and the basic information includes one or more of the following information about the application: a version number, a newspaper name, a signature, and a digital certificate; and when basic information of a first application of the terminal is updated, receiving, by the terminal, instruction information sent by an application server, where the instruction information is used to update the basic information of the first application in the second application list.

FIG. 15 is a flowchart of a method for processing an application according to an embodiment of the present invention. The method shown in FIG. 15 includes the following steps:

1501. A mobile terminal requests a server to download and install an application S that is signed by using digital certificate A.

1502. The mobile terminal instructs the server to update an application list of a user.

1503. The mobile terminal receives an APK of an application S and an application list that are sent by the server.

1504. The mobile terminal installs the application S, and updates an entry corresponding to the application S in an application list cached on the mobile terminal.

1505. The mobile terminal receives an updated application list that is sent by the server, where a digital signature certificate of the application S is updated by a developer to digital certificate B.

1506. The mobile terminal updates the cached application list.

1507. The mobile terminal downloads the application S of a new version, where the application of the new version is signed by using certificate B and released, by the developer.

1508. The mobile terminal verifies the application S by using the latest application list when installing the application S.

In this embodiment of the present invention, overwriting installation of an application S with replaced digital certificate information may be completed by executing 1502, 1503, 1504, 1505, 1506, and 1508 in sequence, where both step 1501 and step 1507 may be replaced with "acquiring an APK of an application S from another device that stores the APK of the application S".

It should be noted that, in this embodiment, the developer may replace a digital certificate that is used to create a digital signature for the application, may replace a package name of the application, or may replace both a digital certificate and a package name; because the latest application list is used to perform verification during installation, a problem of a failure in overwriting installation will not occur.

Specifically, a storage unit of the mobile terminal is configured to store a list of applications that have been installed on the mobile terminal, where the application list is used to record information such as package names, version numbers, and certificates of the applications. A processing unit in the mobile terminal includes a requesting module, a notification module, a receiving module, an installation module, an updating module, and a verifying module. The modules cooperate with each other to implement the foregoing process, which is specifically as follows: the requesting module in the processing unit is configured to request the APK of the application S; the notification module in the processing unit is configured to instruct the server to update the application list; the receiving unit in the processing unit is configured to receive the APK of the application S and the application list; the installation module in the processing unit is configured to install the application S after the receiving module receives the APK of the application S; the updating module in the processing unit is configured to update the application list in the mobile terminal; the verifying module in the processing unit is configured to, when the installation module installs the application S, perform certificate verification on the application S by using the application list that is stored in the storage unit; and a communication unit of the mobile terminal is configured to provide a network connection for the receiving module in the processing unit to receive the APK of the application S and the application list.

The following provides a method for processing an application, including: receiving a first installation package of an application, where the first installation package is corresponding to a first digital certificate, and the first installation package includes a public key of the first digital certificate and first verification information; receiving a second installation package of the application, where the second installation package is corresponding to a second digital certificate, and the second installation package includes a public key of the second digital certificate and second verification information; verifying, according to the first digital certificate, the first verification information, the public key of the second digital certificate, and the second verification information, whether an application corresponding to the second installation package is a new version of an application corresponding to the first installation package; and when the verification is successful, overwriting the citation of an old version with the application of the new version.

FIG. 16 is a flowchart of a method for processing an application according to an embodiment of the present invention. This embodiment is specific to a case in which a package name remains unchanged and a digital certificate is replaced.

1601. Download and install a version V1 of an application S on mobile terminal D, where the version V1 of the application S is signed by an application developer by using digital certificate A, where a public key of digital certificate A and verification information M1 are stored in an APK of the application.

1602. The mobile terminal records the public key of digital certificate A in the version V1 of the application S.

1603. Mobile terminal D downloads and installs a version V2 of the application S, where the version V2 of the application S is an application on which a developer has performed the following processing:

1) the application developer signs a hash value H1 of the version V2 of the application S by using a private key corresponding to digital certificate B to obtain signed verification information S1; and 2) the application developer signs the obtained verification information S1 by using digital certificate A to obtain verification information S2, and saves the hash value H1 and the verification information S2 into an APK of the version V2 of the application S.

1604. In an installation process, first decrypt the verification information S2 by using the public key that is of digital certificate A and stored in the mobile terminal, so as to obtain verification information S1.

1605. Then, decrypt the verification information S1 by using the public key of digital certificate B in the application to obtain a hash value H2, extract H1 from the APK, and compare H1 with H2 to complete the verification.

1606. The verification is successful and installation of the version V2 of the application S is started.

In this embodiment of the present invention, overwriting the application S whose digital certificate has been replaced may be implemented.

In a specific implementation manner of the present invention, a storage unit of the mobile terminal is configured to store information about the application S, including a package name, version information, a digital certificate, and the like of the application S. A processing unit of the mobile terminal includes a downloading module, a recording module, a decrypting module, a comparing module, an extracting module, and an installation module. The modules cooperate together to implement the foregoing process. A specific implementation manner is as follows: the downloading module of the processing unit is configured to download an installation package of the application S; the installation module of the processing unit is configured to install the installation package of the application S that is downloaded by the downloading module; the recording module of the processing unit is configured to record information about the application S when the installation module is installing the application S and after the application S is installed; the decrypting module of the processing unit is configured to decrypt content that is digitally signed by using certificate B and content that is digitally signed by using digital certificate A in the APK of the application S, so as to obtain the content S1 and H2 before the signing; the extracting module of the processing unit is configured to extract the verification information H1 from the APK; the comparing module of the processing unit is configured to compare the verification information H1 that is extracted by the extracting module with H2 that is decrypted by the decrypting module, and if they are the same, the installation module continues to execute an installation operation; and a communication unit of the mobile terminal is configured to provide a network connection for the downloading module of the processing unit to download the installation package of the application S.

The foregoing describes in detail, with reference to FIG. 1 to FIG. 6, a method for sharing an application between terminals according to the embodiments of the present invention. The following describes in detail, with reference to FIG. 17 to FIG. 20, a terminal according to the embodiments of the present invention.

Figure 17:
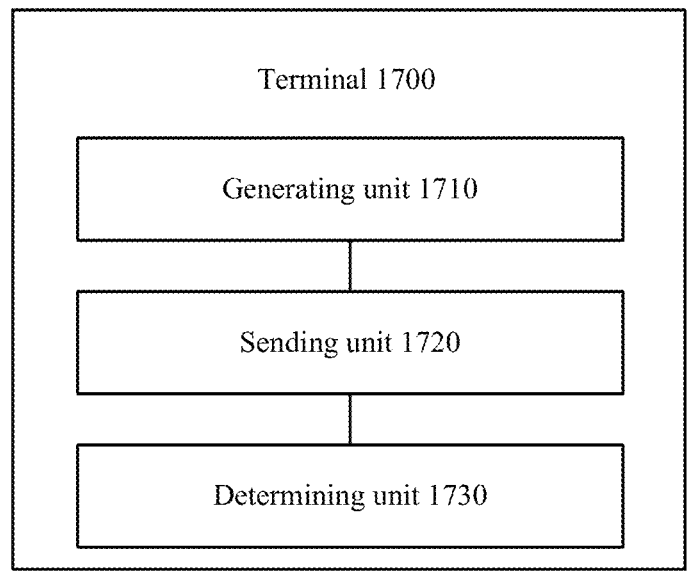
FIG. 17 is a schematic block diagram of a terminal according to an embodiment of the present invention.

FIG. 17 is a schematic block diagram of a terminal according to an embodiment of the present invention. The terminal 1700 shown in FIG. 17 includes a generating unit 1710, a sending unit 1720, and a determining unit 1730.

It should be understood that the terminal 1700 can implement the steps executed by the first terminal (mobile terminal A) in FIG. 1 to FIG. 6, which is not described again herein so as to avoid repetition.

The generating unit 1710 is configured to generate, according to an application that has been installed, a shared application installation package of the application.

The sending unit 1720 is configured to send the shared application installation package generated by the generating unit 1710 to a second terminal, so that the second terminal installs the shared application installation package.

The determining unit 1730 is configured to determine shared data of the application that has been installed, where the shared data is data that is from an application server and required for the application to run.

The sending unit 1720 is further configured to send the shared data determined by the determining unit 1730 to the second terminal, so that the second terminal uses the shared data when running the shared application.

In this embodiment of the present invention, when sharing an application, two terminals not only share an installation package of the application, but also share shared data of the application, so that a receiving end does not need to download the shared data from an application server, which facilitates user operations at the receiving end and improves user experience.

Optionally, according to an embodiment, the shared data is stored in a public data file of the terminal, and the determining unit 1730 is specifically configured to extract the shared data from the public data file.

Optionally, according to another embodiment, a storage path of the public data file on the terminal is a storage path that is defined according to an instruction of the installation package when the installation package is run.

Optionally, according to another embodiment, a path of the public data file on the terminal is a storage path defined by the terminal.

Optionally, according to another embodiment, the shared data is data in an offline data package provided by the application server, and the terminal 1700 further includes a recording unit, configured to record a storage position of the data in the offline data package; and the determining unit 1730 is specifically configured to extract the data in the offline data package from the recorded storage position as the shared data.

Figure 18:
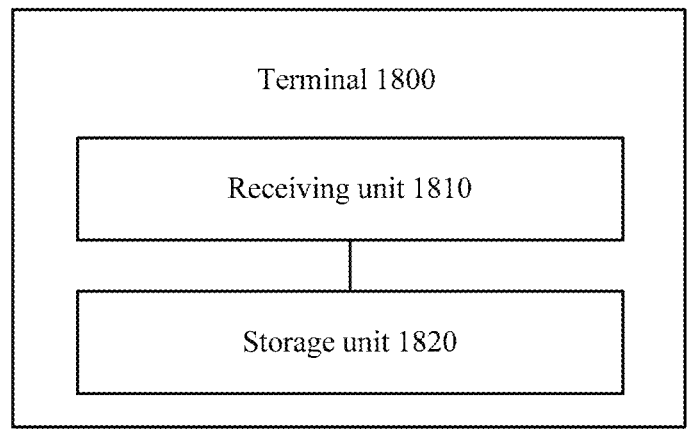
FIG. 18 is a schematic block diagram of another terminal according to an embodiment of the present invention.

FIG. 18 is a schematic block diagram of another terminal according to an embodiment of the present invention. The terminal 1800 shown in FIG. 18 includes a receiving unit 1810 and a storage unit 1820.

It should be understood that the terminal 1800 can implement the steps executed by the second terminal (mobile terminal B) in FIG. 1 to FIG. 6, which is not described again herein so as to avoid repetition.

The receiving unit 1810 is configured to receive a shared application installation package of an application from a first terminal, and receive shared data of the application, where the shared data is data that is from an application server and required for the application to run, and the shared application installation package of the application is generated by the first terminal according to the application that has been installed.

The storage unit 1820 is configured to store the shared data received by the receiving unit 1810.

In this embodiment of the present invention, when sharing an application, two terminals not only share an installation package of the application, but also share shared data of the application, so that a receiving end does not need to download the shared data from an application server, which facilitates user operations at the receiving end and improves user experience.

Figure 19:
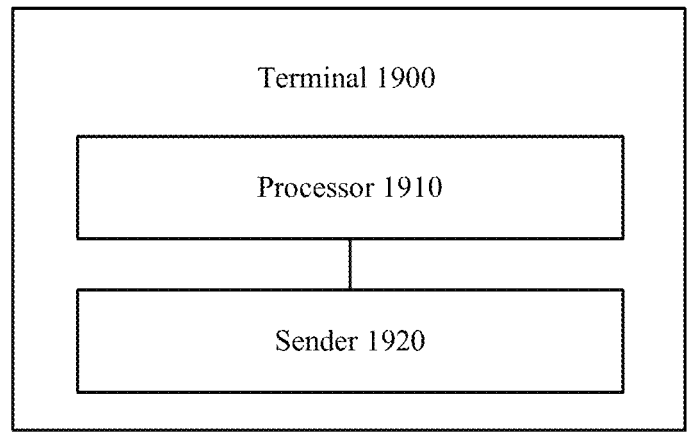
FIG. 19 is a schematic block diagram of a terminal according to an embodiment of the present invention.

FIG. 19 is a schematic block diagram of a terminal according to an embodiment of the present invention. The terminal 1900 shown in FIG. 19 includes a processor 1910 and a sender 1920.

It should be understood that the terminal 1900 can implement the steps executed by the first terminal (mobile terminal A) in FIG. 1 to FIG. 6, which is not described again herein so as to avoid repetition.

The processor 1910 is configured to generate, according to an application that has been installed, a shared application installation package of the application.

The sender 1920 is configured to send the shared application installation package generated by the processor 1910 to a second terminal, so that the second terminal installs the shared application installation package.

The processor 1910 is further configured to determine shared data of the application that has been installed, where the shared data is data that is from an application server and required for the application to run.

The sender 1920 is further configured to send the shared data determined by the processor 1910 to the second terminal, so that the second terminal uses the shared data when running the shared application.

In this embodiment of the present invention, when sharing an application, two terminals not only share an installation package of the application, but also share shared data of the application, so that a receiving end does not need to download the shared data from an application server, which facilitates user operations at the receiving end and improves user experience.

Optionally, according to an embodiment, the shared data is stored in a public data file of the terminal, and the processor 1910 is specifically configured to extract the shared data from the public data file.

Optionally, according to another embodiment, a storage path of the public data file on the terminal is a storage path that is defined according to an instruction of the installation package when the installation package is run.

Optionally, according to another embodiment, a path of the public data file on the terminal is a storage path defined by the terminal.

Optionally, according to another embodiment, the shared data is data in an offline data package provided by the application server, and the processor 1910 is further configured to record a storage position of the data in the offline data package; and extract the data in the offline data package from the recorded storage position as the shared data.

Figure 20:
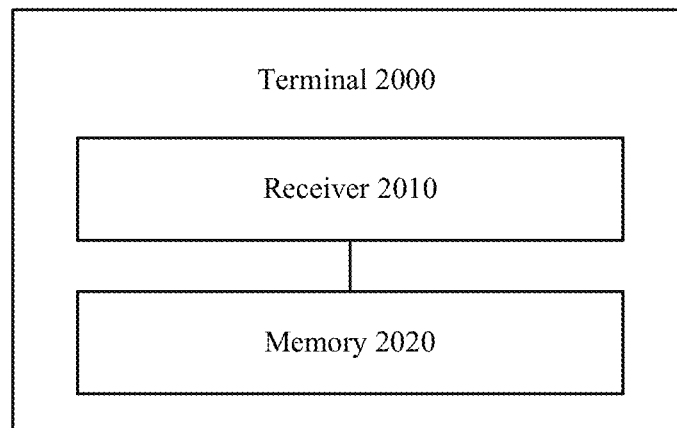
FIG. 20 is a schematic block diagram of another terminal according to an embodiment of the present invention.

FIG. 20 is a schematic block diagram of another terminal according to an embodiment of the present invention. The terminal 2000 shown in FIG. 20 includes a receiver 2010 and a memory 2020.

It should be understood that the terminal 2000 can implement the steps executed by the second terminal (mobile terminal B) in FIG. 1 to FIG. 6, which is not described again herein so as to avoid repetition.

The receiver 2010 is configured to receive a shared application installation package of an application from a first terminal, and receive shared data of the application, where the shared data is data that is from an application server and required for the application to run, and the shared application installation package of the application is generated by the first terminal according to the application that has been installed.

The memory 2020 is configured to store the shared data received by the receiver 2010.

In this embodiment of the present invention, when sharing an application, two terminals not only share an installation package of the application, but also share shared data of the application, so that a receiving end does not need to download the shared data from an application server, which facilitates user operations at the receiving end and improves user experience.

The foregoing describes in detail, with reference to FIG. 7 to FIG. 12, a method for verifying application security according to the embodiments of the present invention. The following describes in detail, with reference to FIG. 21 to FIG. 24, a terminal and an application server according to the embodiments of the present invention.

Figure 21:
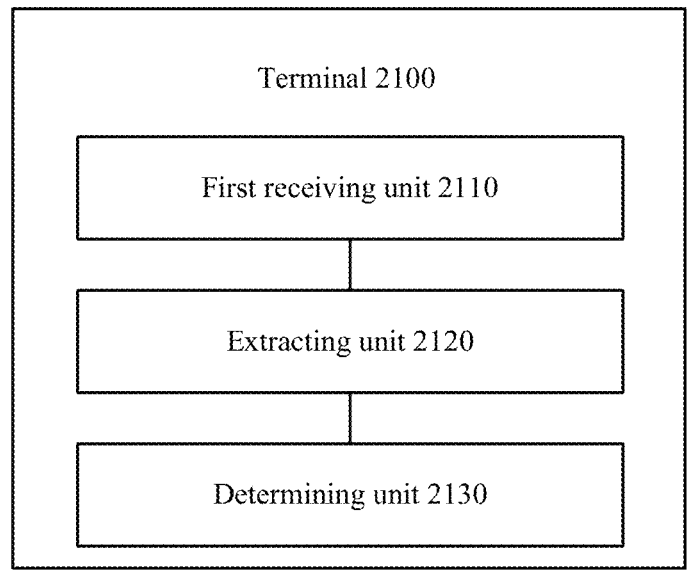
FIG. 21 is a schematic block diagram of a terminal according to an embodiment of the present invention.

FIG. 21 is a schematic block diagram of a terminal according to an embodiment of the present invention. The terminal 2100 shown in FIG. 21 includes a first receiving unit 2110, an extracting unit 2120, and a determining unit 2130.

It should be understood that the terminal 2100 shown in FIG. 21 can implement the steps that are executed by the terminal in FIG. 7 to FIG. 12, which is not described again herein so as to avoid repetition.

The first receiving unit 2110 is configured to receive a first installation package of an application.

The extracting unit 2120 is configured to extract verification information from the first installation package received by the first receiving unit 2110, where the verification information is used to determine whether the first installation package is from an application server.

The determining unit 2130 is configured to determine, according to the verification information extracted by the extracting unit 2120, whether the first installation package is from the application server; and when the first installation package is not from the application server, acquire a second installation package of the application from the application server, and overwrite the first installation package by using the second installation package; or when the first installation package is from the application server, run the first installation package.

In this embodiment of the present invention, after acquiring an installation package, a first terminal extracts verification information from the installation package, and verifies, according to the verification information, whether the installation package is from an application server, which improves security of application installation.

Optionally, according to an embodiment, the determining unit 2130 is specifically configured to: send the verification information to an application server, so that the application server checks, according to a match between the verification information and source information, whether the first installation package is from the application server, where the source information is extracted by the application server from the second installation package; and receive a check result of the application server.

Figure 22:
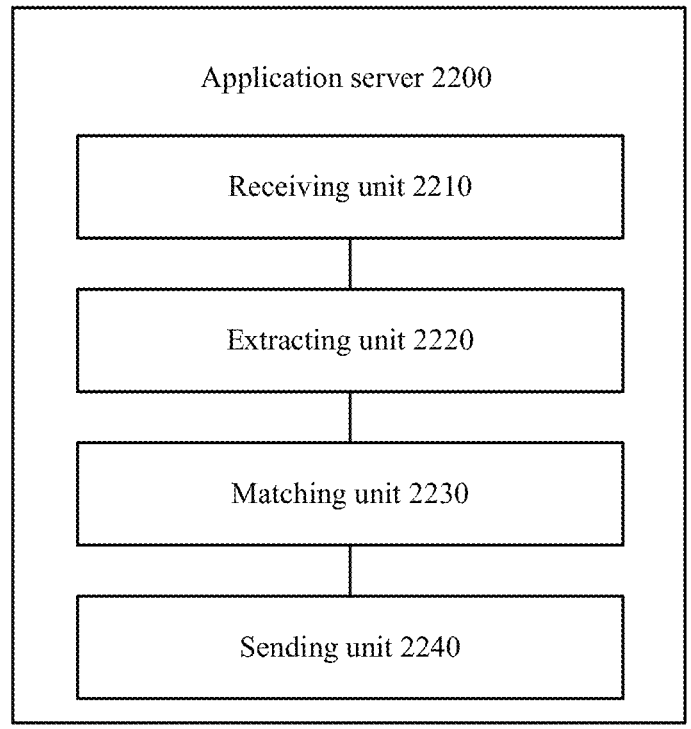
FIG. 22 is a schematic block diagram of an application server according to an embodiment of the present invention.

FIG. 22 is a schematic block diagram of an application server according to an embodiment of the present invention. The application server 2200 shown in FIG. 22 includes a receiving unit 2210, an extracting unit 2220, a matching unit 2230, and a sending unit 2240.

It should be understood that the application server 2200 can implement the steps that are executed by the application server in FIG. 7 to FIG. 12, which is not described again herein so as to avoid repetition.

The receiving unit 2210 is configured to receive verification information sent by a first terminal, where the verification information is extracted by the first terminal from a first installation package of an application, and the verification information is used to determine whether the first installation package is from the application server.

The extracting unit 2220 is configured to extract source information from a second installation package that is of an application and stored in the application server 2200.

The matching unit 2230 is configured to determine, according to a match between the source information extracted by the extracting unit and the verification information received by the receiving unit, whether the first installation package is from the application server.

The sending unit 2240 is configured to send a matching result of the matching unit to the first terminal.

In this embodiment of the present invention, after acquiring an installation package, a first terminal extracts verification information from the installation package, and verifies, according to the verification information, whether the installation package is from an application server, which improves security of application installation.

Figure 23:
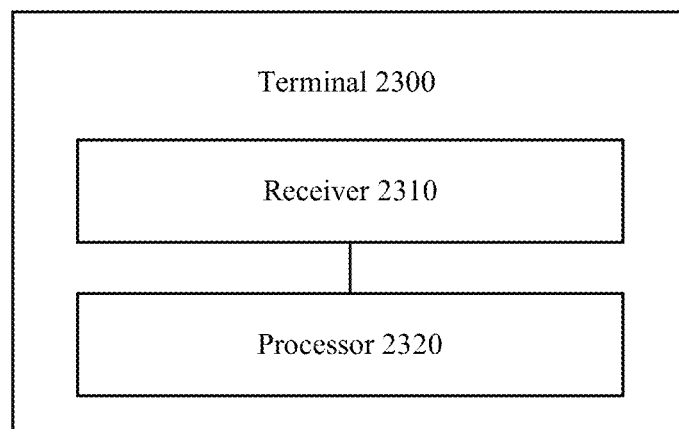
FIG. 23 is a schematic block diagram of a terminal according to an embodiment of the present invention.

FIG. 23 is a schematic block diagram of a terminal according to an embodiment of the present invention. The terminal 2300 shown in FIG. 23 includes a receiver 2310 and a processor 2320.

It should be understood that the terminal 2300 can implement the steps that are executed by the terminal in FIG. 7 to FIG. 12, which is not described again herein so as to avoid repetition.

The receiver 2310 is configured to receive a first installation package of an application.

The processor 2320 is configured to extract verification information from the first installation package received by the receiver 2310, where the verification information is used to determine whether the first installation package is from an application server; determine, according to the verification information, whether the first installation package is from the application server; and when the first installation package is not from the application server, acquire a second installation package of the application from the application server, and overwrite the first installation package by using the second installation package; or when the first installation package is from the application server, run the first installation package.

In this embodiment of the present invention, after acquiring an installation package, a first terminal extracts verification information from the installation package, and verifies, according to the verification information, whether the installation package is from an application server, which improves security of application installation.

Optionally, according to an embodiment, the processor 2320 is specifically configured to: send the verification information to an application server, so that the application server checks, according to a match between the verification information and source information, whether the first installation package is from the application server, where the source information is extracted by the application server from the second installation package; and receive a check result of the application server.

Figure 24:
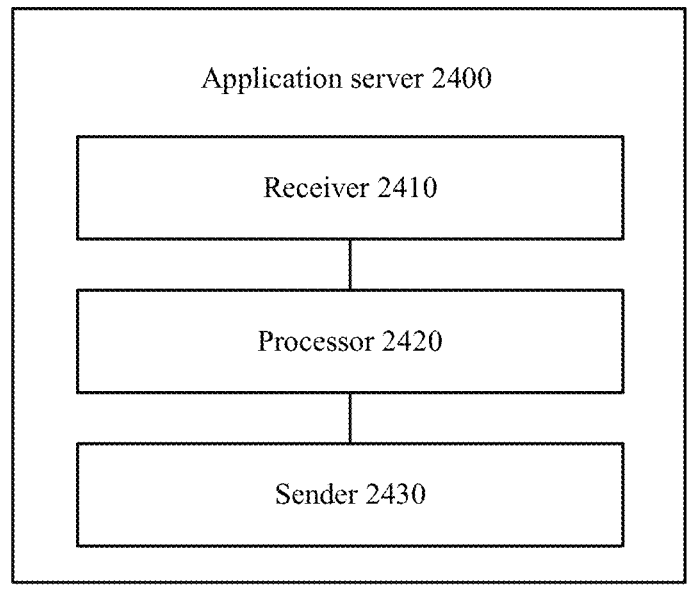
FIG. 24 is a schematic block diagram of an application server according to an embodiment of the present invention.

FIG. 24 is a schematic block diagram of an application server according to an embodiment of the present invention. The application server 2400 shown in FIG. 24 includes a receiver 2410, a processor 2420, and a sender 2430.

It should be understood that the application server 2400 can implement the steps that are executed by the application server in FIG. 7 to FIG. 12, which is not described again herein so as to avoid repetition.

The receiver 2410 is configured to receive verification information sent by a first terminal, where the verification information is extracted by the first terminal from a first installation package of an application, and the verification information is used to determine whether the first installation package is from the application server.

The processor 2420 is configured to extract source information from a second installation package that is of an application and stored in the application server 2400; and determine, according to a match between the source information and the verification information received by the receiver 2410, whether the first installation package is from the application server.

The sender 2430 is configured to send a matching result of the processor 2420 to the first terminal.

In this embodiment of the present invention, after acquiring an installation package, a first terminal extracts verification information from the installation package, and verifies, according to the verification information, whether the installation package is from an application server, which improves security of application installation.

The foregoing describes, with reference to FIG. 13 to FIG. 16, in detail a method for processing an application according to an embodiment of the present invention. The following describes, with reference to FIG. 25 to FIG. 26, in detail a terminal and an application server according to an embodiment of the present invention.

Figure 25:
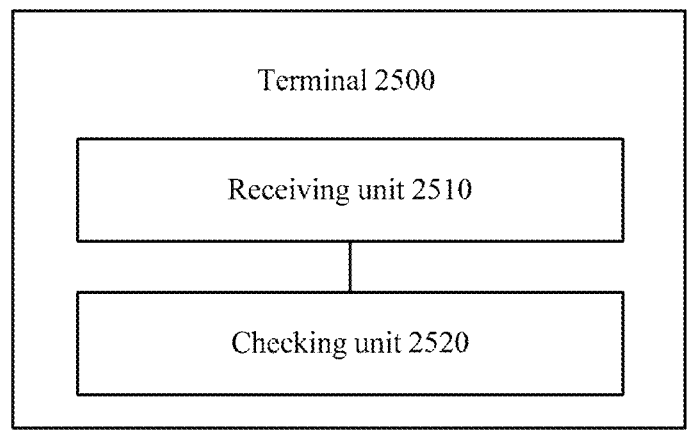
FIG. 25 is a schematic block diagram of a terminal according to an embodiment of the present invention.

FIG. 25 is a schematic block diagram of a terminal according to an embodiment of the present invention. The terminal 2500 shown in FIG. 25 includes a receiving unit 2510 and a checking unit 2520.

It should be understood that the terminal 2500 can implement the steps that are executed by the terminal in FIG. 13 to FIG. 16, which is not described again herein so as to avoid repetition.

The receiving unit 2510 is configured to receive an installation package of a first application, where the installation package includes an identifier of the first application and an identifier of a second application, and the second application is an old version of the first application.

The checking unit 2520 is configured to check, according to the identifier of the second application in the installation package received by the receiving unit 2510, whether the second application has been installed on a system; and if the second application has been installed on the system, install the first application and delete the second application.

In this embodiment of the present invention, when an installation package of a first application is received, whether an old version of the first application has been installed on a system is checked according to a unique identifier of the old version carried in the installation package; and when the old version of the application is detected, the old version of the application is deleted, which saves storage resources of a terminal.

Figure 26:
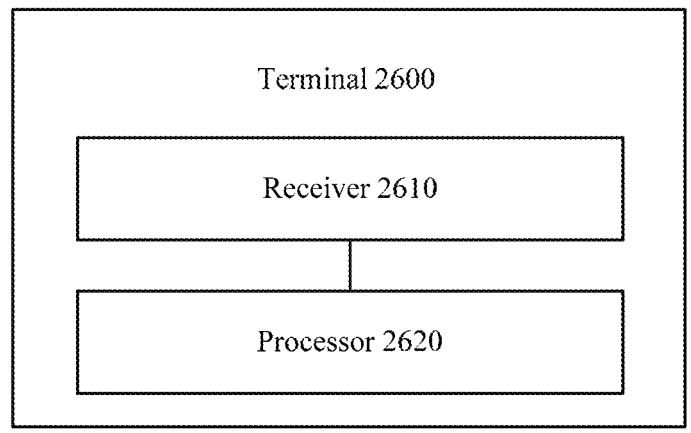
FIG. 26 is a schematic block diagram of a terminal according to an embodiment of the present invention.

FIG. 26 is a schematic block diagram of a terminal according to an embodiment of the present invention. The terminal 2600 shown in FIG. 26 includes a receiver 2610 and a processor 2620.

It should be understood that the terminal 2600 can implement the steps that are executed by the terminal in FIG. 13 to FIG. 16, which is not described again herein so as to avoid repetition.

The receiver 2610 is configured to receive an installation package of a first application, where the installation package includes an identifier of the first application and an identifier of a second application, and the second application is an old version of the first application; for example, the identifier of the first application may be a unique identifier of the first application, and the identifier of the second application may be a unique identifier of the second application.

The processor 2620 is configured to check, according to the identifier of the second application in the installation package received by the receiver 2610, whether the second application has been installed on a system; and if the second application has been installed on the system, install the first application and delete the second application.

In this embodiment of the present invention, when an installation package of a first application is received, whether an old version of the first application has been installed on a system is checked according to a unique identifier of the old version carried in the installation package; and when the old version of the application is detected, the old version of the application is deleted, which saves storage resources of a terminal.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read- Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A system comprising: a first mobile phone and a second mobile phone,
wherein the first mobile phone is capable of directly connecting with the second mobile phone via a WiFi connection,
wherein the first mobile phone is configured to carry out a method comprising:
downloading a first application from a first application server;
downloading a second application from a second application server;
storing a first installation package of the first application and a second installation package of the second application;
installing, in the first mobile phone, the first application from the first installation package and the second application from the second installation package;
running, on the first mobile phone after the installing, the first application and the second application;
generating, on the first mobile phone, a first private data file and a second private data file, wherein the first private data file contains first data generated in accordance with the running the first application, and the second private data file contains second data generated in accordance with the running the second application, wherein the first private data file includes: an account information, a contacts information, and a chat record;
receiving at least a first instruction and a second instruction, in accordance with touchscreen actions on the first mobile phone, wherein:
the first instruction indicates to the first terminal to provide the first private data file from among the first private data file and the second private data file, and
the second instruction, distinct from the first instruction, indicates to the first terminal to provide the first installation package from among the first installation package and the second installation package; and
sending the first installation package and the first private data file from the first mobile phone to the second mobile phone directly via the WiFi connection between the first mobile phone and the second mobile phone without using an intermediate server, and
wherein the second mobile phone is configured to carry out a method comprising:
receiving the first installation package and the first private data file via the WiFi connection between the first mobile phone and the second mobile phone;
automatically installing the first application in the second mobile phone based on the first installation package; and
running, after the receiving and installing, the first application in the second mobile phone based on data obtained from the first private data file.

2. The system of claim 1, wherein the first installation package comprises an apk file.

3. The system of claim 1, wherein the first private data file further comprises user data from at least one of the group consisting of: a game record, a cache data generated when the first application is used, a data downloaded by using a download manager, a picture taken by using a camera, and a user-marked private data.

4. The system of claim 1, wherein the second mobile phone is further configured to check an integrity of the first installation package before installing the first application.

5. The system of claim 1, wherein the first application is automatically installed in the second mobile phone in response to the first installation package being received.

6. The system of claim 1, wherein the first installation package comprises a signature of the first application.

7. The system of claim 6, wherein the second mobile phone is further configured to determine that the first application is installed before the first installation package being received, and check that the signature of the first installation package is the same as a saved signature before overwriting the first application.

8. A first mobile phone capable of directly connecting with a second mobile phone via a WiFi connection, the first mobile phone comprising:
a processor, and
a non-transitory computer-readable medium including computer-executable instructions that, when executed by the processor, cause the first mobile phone to carry out a method comprising:
downloading a first application from a first application server;
downloading a second application from a second application server;
storing a first installation package of the first application and a second installation package of the second application;
installing the first application from the first installation package and the second application from the second installation package;
running, after the installing, the first application and the second application;
generating a first private data file and a second private data file, wherein the first private data file contains first data generated in accordance with the running the first application, and the second private data file contains second data generated in accordance with the running the second application, wherein the first private data file includes: an account information, a contacts information, and a chat record;
receiving at least a first instruction and a second instruction, in accordance with touchscreen actions on the first mobile phone, wherein:
the first instruction indicates to the first terminal to provide the first private data file from among the first private data file and the second private data file, and
the second instruction, distinct from the first instruction, indicates to the first terminal to provide the first installation package from among the first installation package and the second installation package; and
sending the first installation package and the first private data file to a second mobile phone directly via the WiFi connection between the first mobile phone and the second mobile phone without using an intermediate server, and wherein the first installation package and the first private data file facilitate the second mobile phone, upon receiving the first installation and first private data file, automatically installing the first application based on the first installation package and running the first application based on data obtained from the first private data file.

9. The first mobile phone of claim 8, wherein the first installation package comprises an apk file.

10. The first mobile phone of claim 8, wherein the first private data file further comprises data from at least one of the group consisting of: a game record, a cache data generated when the first application is used, a data downloaded by using a download manager, a picture taken by using a camera, and a user-marked private data.

11. The first mobile phone of claim 8, wherein the first installation package comprises a signature of the first application.

12. A second mobile phone capable of directly connecting with a first mobile phone via a WiFi connection, the second mobile phone comprising:
a processor, and
a non-transitory computer-readable medium including computer-executable instructions that, when executed by the processor, cause the second mobile phone to carry out a method comprising:
receiving a first installation package and a first private data file via the WiFi connection between the first mobile phone and the second mobile phone;
automatically installing the first application based on the first installation package; and
running, after the receiving and installing, the first application in the second mobile phone based on data obtained from the first private data file,
wherein the first installation package and the first private data file are obtained by the first mobile device:
downloading the first application from a first application server;
storing the first installation package of the first application;
installing, in the first mobile phone, the first application from the first installation package;
running, on the first mobile phone after the installing, the first application;
generating, on the first mobile phone, the first private data file, wherein the first private data file contains first data generated in accordance with the running the first application, and wherein the first private data file includes: an account information, a contacts information, and a chat record;
receiving at least a first instruction and a second instruction, in accordance with touchscreen actions on the first mobile phone, wherein:
the first instruction indicates to the first terminal to provide the first private data file, and
the second instruction, distinct from the first instruction, indicates to the first terminal to provide the first installation package.

13. The second mobile phone of claim 12, wherein the first installation package comprises an apk file.

14. The second mobile phone of claim 12, wherein the first private data file further comprises user data from at least one of the group consisting of: a game record, a cache data generated when the first application is used, a data downloaded by using a download manager, a picture taken by using a camera, and a user-marked private data.

15. The second mobile phone of claim 12, wherein the second mobile phone is further configured to check an integrity of the first installation package before installing the first application.

16. The second mobile phone of claim 12, wherein the first application is automatically installed in the second mobile phone in accordance with the receiving the first installation package and the first private data file via the WiFi connection.

17. The second mobile phone of claim 12, wherein the first installation package comprises a signature of the first application.

18. The second mobile phone of claim 17, wherein the second mobile phone is further configured to:
determine that the first application is installed before the first installation package being received during the receiving the first installation package and the first private data file via the WiFi connection, and
check that the signature of the first installation package is the same as a saved signature before overwriting the first application.

* * * * *

UNITED STATES PATENT AND TRADEMARK OFFICE
CERTIFICATE OF CORRECTION

| | | |
|---|---|---|
| PATENT NO. | : 11,606,677 B2 | Page 1 of 1 |
| APPLICATION NO. | : 16/922477 | |
| DATED | : March 14, 2023 | |
| INVENTOR(S) | : Wang et al. | |

It is certified that error appears in the above-identified patent and that said Letters Patent is hereby corrected as shown below:

On the Title Page

Right-Hand Column, Assistant Examiner: "Berhanu Shitayewoldetadik" should read -- Berhanu Shitayewoldetsadik --.

Signed and Sealed this
Twenty-seventh Day of June, 2023

Katherine Kelly Vidal
*Director of the United States Patent and Trademark Office*